United States Patent
Chawda et al.

(10) Patent No.: US 11,327,777 B1
(45) Date of Patent: May 10, 2022

(54) ENABLING FOCUS TIME BASED ON SCHOOL ASSIGNMENT COMPLETION INFORMATION

(71) Applicant: Microsoft Technology Licensing, LLC, Redmond, WA (US)

(72) Inventors: Hemanshu K. Chawda, Redmond, WA (US); Chang-Ling Wu, Seattle, WA (US); Mouna Sidi Hida, Redmond, WA (US); Jérôme Vasseur, Bothell, WA (US); Kaylie J. Wilson, Bellevue, WA (US); Gregory H. R. Mialon, Kirkland, WA (US); Vaibhav Jain, Kirkland, WA (US); Richard Fang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/356,134

(22) Filed: Jun. 23, 2021

(51) Int. Cl.
G06F 9/451 (2018.01)
G06F 3/0481 (2022.01)
G06K 9/62 (2022.01)
G06N 20/00 (2019.01)

(52) U.S. Cl.
CPC ............ *G06F 9/451* (2018.02); *G06F 3/0481* (2013.01); *G06K 9/6256* (2013.01); *G06N 20/00* (2019.01)

(58) Field of Classification Search
CPC ..... G06F 9/451; G06F 3/0481; G06K 9/6256; G06N 20/00
See application file for complete search history.

(56) References Cited

U.S. PATENT DOCUMENTS

| 9,942,336 B2 | 4/2018 | Bostick et al. |
| 2020/0092373 A1 | 3/2020 | Kurian et al. |

OTHER PUBLICATIONS

"Habyts", Retrieved from: https://habyts.com/common-screen-time-issues/homework/. Retrieved Date: Mar. 25, 2021, 4 Pages.
"Net Nanny", Retrieved from: https://web.archive.org/web/20210115172833/https://www.netnanny.com/features/time-management/, Jan. 15, 2021, 10 Pages.
"Qustodio", Retrieved from: https://www.qustodio.com/en/premium-special-promo/?source=aw&utm_source=awin&utm_medium=292379&utm_campaign=Ad+Practitioners%2C+LLC&utm_term=Editorial+Content&awc=7874_1616691733_25b1fbb11697ac917c13256cb76a1b2b&utm_content=text, Retrieved Date: Mar. 25, 2021, 8 Pages.
"The Complete Screen Time Parental Control App", Retrieved from: https://web.archive.org/web/20210314092827/https:/ourpact.com/, Mar. 14, 2021, 15 Pages.

(Continued)

*Primary Examiner* — Pei Yong Weng

(57) ABSTRACT

Methods, systems and storage media for limiting access to one or more of devices and applications for a period of time are disclosed. Some examples may include: receiving electronic assignment information indicating that at least one assignment associated with a user is incomplete, identifying a block of time based on the at least one incomplete assignment and assigning a focus time session to the identified block of time, causing at least one of an application or device to become disabled based on a configuration profile applied during the focus time session, receiving an indication that the at least one incomplete assignment associated with the user has been completed and causing the previously disabled at least one of the application or device to become enabled.

20 Claims, 17 Drawing Sheets

(56) References Cited

OTHER PUBLICATIONS

Baldwin, Dave, "The Best Parental Control Apps and Devices for Safe Internet Browsing", Retrieved from: https://www.fatherty.com/gear/best-parental-control-devices-routers/, Jan. 21, 2021, 7 Pages.
Clark, Ashley, "Attention and Screen Time", https://kidslox.com/issues/bad-attention-and-screen-time/, Nov. 1, 2012, 6 Pages.
Schafer, Paul, "Focus plan", Retrieved from: https://docs.microsoft.com/en-us/workplace-analytics/myanalytics/use/focus-plan, Mar. 8, 2021, 15 Pages.

ENABLING FOCUS TIME BASED ON SCHOOL ASSIGNMENT COMPLETION INFORMATION

BACKGROUND

The use of screen time by children has increased as devices and applications have become more prevalent in society. Not all screen time is created equal however. For example, screen time may be educational in nature and assist with a child's learning. In addition, screen time may serve as a form of entertainment. Recognizing that screen time may be divided into different types or categories, including but not limited to education and entertainment categories, the use of screen time can be used to motivate children into getting tasks or schoolwork completed. However, it is often difficult to understand how the use of screen time impacts a child's learning. Moreover, sufficient information is generally not available for a parent or guardian to know when to put education first or when to allow child to use screen time for entertainment purposes.

It is with respect to these and other general considerations that examples have been described. Although relatively specific problems have been discussed, it should be understood that the examples should not be limited to solving the specific problems identified in the background.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In accordance with examples of the present disclosure, a method for enabling a focus time based on school assignment completion information is described. The method may include receiving, from a learning management system database, electronic assignment information indicating that at least one assignment associated with a first user identifier is incomplete, wherein the electronic assignment information includes metadata associated with at least one of a subject of the at least one assignment, a period of time associated with the at least one assignment, or a completion date associated with the at least one assignment; identifying, by an electronic calendar service associated with the first user identifier, a block of time based on the metadata included in the electronic assignment information; assigning, by an electronic scheduling service, a focus time session identifier to the block of time identified by the electronic calendar service associated with the first user identifier; retrieving, by a focus time configurator, at least one of an application configuration profile or a device configuration profile based on the focus time session identifier; determining a second user identifier that is associated with the first user identifier; restricting a functionality of at least one of an application or a device associated with the second user identifier based on the at least one of the application configuration profile or the device configuration profile retrieved by the focus time configurator; receiving, by the learning management system database, an indication that the at least one incomplete assignment associated with the first user identifier has been completed; and permitting the previously restricted functionality of the at least one of the application or the device associated with the second user identifier.

In accordance with examples of the present disclosure, a for enabling a focus time based on school assignment completion information is described. The system may include one or more hardware processors configured by machine-readable instructions to: receive, from a learning management system database, electronic assignment information indicating that at least one assignment associated with a first user identifier is incomplete, wherein the electronic assignment information includes metadata associated with at least one of a subject of the at least one assignment, a period of time associated with the at least one assignment, or a completion date associated with the at least one assignment; identify, by an electronic calendar service associated with the first user identifier, a block of time based on the metadata included in the electronic assignment information; assign, by an electronic scheduling service, a focus time session identifier to the block of time identified by the electronic calendar service; retrieve, by a focus time configurator, at least one of an application configuration profile or a device configuration profile based on the focus time session identifier; determine a second user identifier that is associated with the first user identifier; restrict a functionality of at least one of an application or a device associated with the second user identifier based on the at least one of the application configuration profile or the device configuration profile retrieved by the focus time configurator; receive, by the learning management system database, an indication that the at least one incomplete assignment associated with the first user identifier has been completed; and permitting the previously restricted functionality of the at least one of the application or the device associated with the second user identifier.

In accordance with examples of the present disclosure, a computer-readable storage medium including instructions being executable by one or more processors to perform a method for enabling a focus time based on school assignment completion information is described The method may include receiving electronic assignment information from a learning system management database indicating that at least one assignment associated with a first user identifier is incomplete, wherein the electronic assignment information includes metadata associated with at least one of a subject of the at least one assignment, a period of time associated with the at least one assignment, or a completion date associated with the at least one assignment; identifying, by an electronic calendar service associated with the first user identifier, a block of time based on the metadata; retrieving at least one of an application configuration profile or a device configuration profile based on the block of time; determining a second user identifier that is associated with the first user identifier; causing at least one of an application or device associated with the second user identifier to become disabled based on the at least one of the application configuration profile or the device configuration profile; receiving, by the learning management system database, an indication that the at least one incomplete assignment associated with the first user identifier has been completed; and causing the previously disabled at least one of the application or the device associated with the second user identifier to become enabled.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
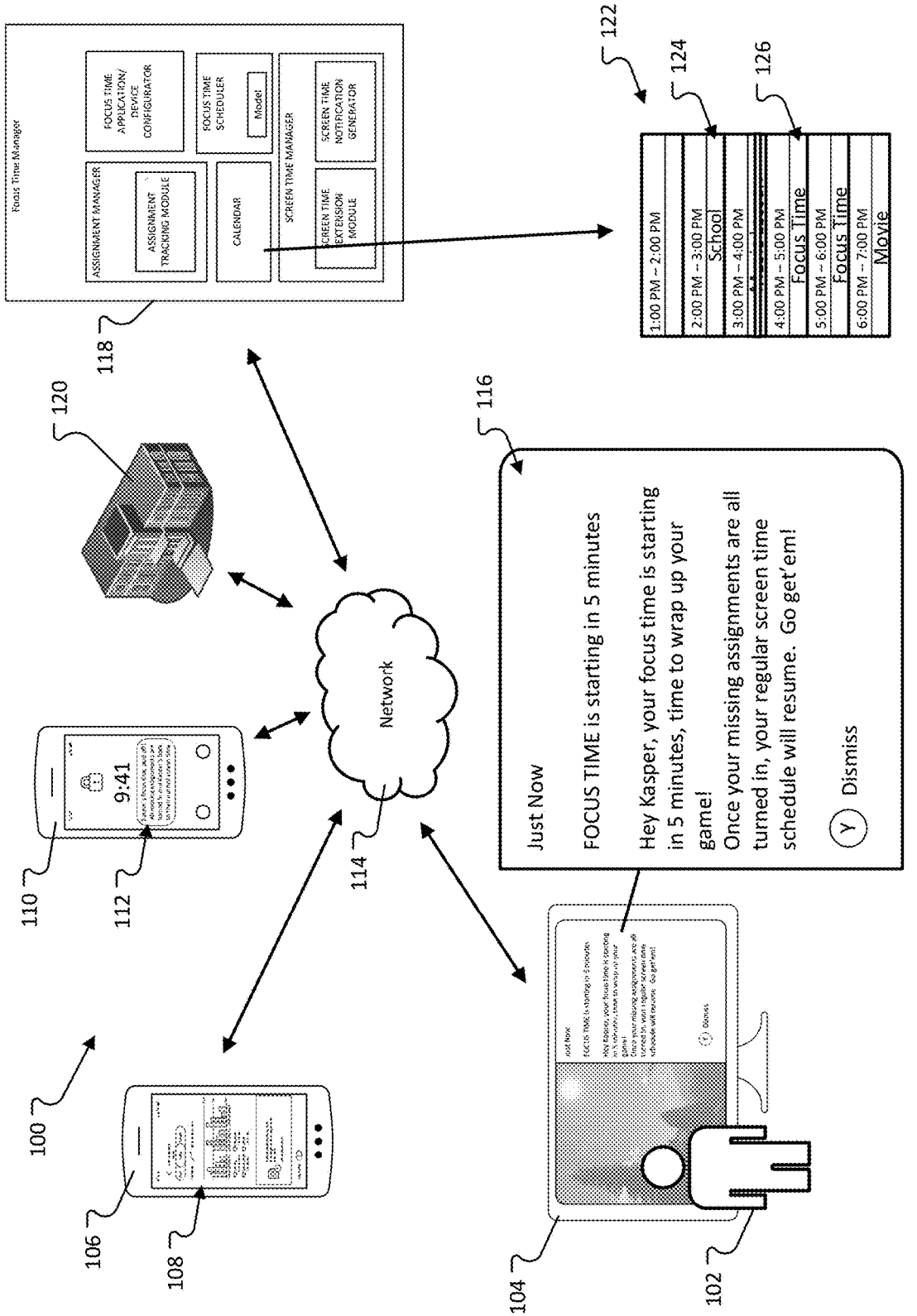
FIG. 1 depicts details of a screen time management platform in accordance with examples of the present disclosure

In the following detailed description, references are made to the accompanying drawings that form a part hereof, and in which are shown by way of illustrations, specific instances or examples. These aspects may be combined, other aspects may be utilized, and structural changes may be made without departing from the present disclosure. Some instances may be practiced as methods, systems, or devices. Accordingly, instances may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Many schools have a digital record of what assignments a child has or has not turned in, and many schools make this information available programmatically via an application programming interface (API) for example. The data from the schools may be accessed via the API and combined with a screen time management platform to create new and unique experiences whereby parents and/or guardians have the ability to manage an amount, timing, and content of screen time that a child may use. In accordance with examples of the present disclosure, a user (which can be a parent/guardian or a child) is provided with a user interface which allows the user to turn on a "focus time" session in multiple ways. In examples, school information may automatically change parental controls and provide or otherwise configure a focus time that may limit one or more of an app usage, a device usage, a web site usage and/or access, access to files, folders, pictures, etc., for a certain period of time. School information may refer to, but is not limited to assignments, grades, tasks, etc. As one non-limiting example, the focus time session may be enabled automatically before an assignment is due to be turned in. Alternatively, or in addition, focus time may be enabled until all missing assignments are turned in. When focus time is enabled, devices and applications used by a child can be managed (e.g., turned off, disabled, restricted, or otherwise limited in capability) until the one or more assignments have been turned in.

In examples, a public API of a connected learning management system (LMS) that a school may use can be accessed to retrieve school information that is specific to the child. For example, a public assignments API of the LMS may be accessed to retrieve assignment information specific to the child. When an assignment is about to be due, the screen time management platform can automatically block screen time of non-educational material based on a category-type setting for example. If the assignment status indicates that it has already been turned in, then the focus time session does not need to be enabled, since the assignment is complete already and therefor screen time associated with the non-educational applications and devices is not restricted. Once a focus time session is enabled, the screen time allowed for that user will be limited to educational categories until the user has turned in, submitted, or otherwise completed the assignment that is about to be due. In examples, educational categories may refer to educational content, educational applications, and/or educational devices. For example, educational content may include but is not limited to: subject specific categories such as but not limited to: math, science, social studies, reading, etc. As another example, educational content may include but is not limited to: educational websites, school-sponsored content repositories, school-approved repositories, content repositories associated with a learning platform, etc. Educational applications may include but are not limited to: school-approved applications or apps, school-sponsored applications or apps, etc. Educational devices may be those devices (e.g., laptop, tablet, etc.) that are provided by or otherwise approved by a school or other learning platform. In examples, non-educational categories may refer to categories not covered by the educational categories. For example, non-educational categories may include non-school approved devices, such as a gaming system. As another example, non-educational categories may include non-educational content such as but not limited to: sports websites, shopping websites, gaming websites, streaming games, news content sources, etc. As another example, non-educational categories may include non-educational applications, such as but not limited to: gaming apps or applications, email apps or applications, social media apps or applications, etc. The screen time management platform can retrieve information from the API indicating that the assignment was turned in; accordingly, the focus time session may be turned off or otherwise expire such that the child or student goes back to their regular screen time limits.

In accordance with examples of the present disclosure, a focus time session may be enabled until all missing or late assignments have been turned in; accordingly, the screen time management platform may act as a mechanism to assist a user to complete missing/late homework. For example, a parent may receive information from the screen time management platform indicating that their child has outstanding, missing, or incomplete assignments for a period of time. Accordingly, a parent may enable the focus time session to limit their child's access to educational screen time until the child has turned in all their missing, incomplete, or outstanding assignments. Thus, the screen time management platform may interface with an assignments API, but allow a parent or guardian to control the screen time experience of the child. In some examples, parents are not the only users that would be able to enable a focus time session. For example, the child, the child's teacher, or another individual or system of educational authority may enable a focus time session to help prevent distractions and limit screen time to specific categories of content (e.g. educational content).

As another example, an API of the LMS may be accessed to retrieve school information specific to the child. When the school information indicates that some criteria is met (e.g., an assignment is missing, about to be due, a low grade is received, etc.), the screen time management platform can automatically block screen time of non-educational material based on a category-type setting for example. If the school information indicates that some criteria have been satisfied, then the focus time session does not need to be enabled; therefore, screen time associated with the non-educational applications and devices is not restricted. Once a focus time session is enabled, the screen time allowed for that user can be limited to only educational categories until the school information criteria has been satisfied. The screen time management platform can retrieve information from the API indicating that the school information criteria has been satisfied and the focus time session may be turned off or otherwise expire such that the child or student goes back to their regular screen time limits.

In some examples, the screen time management platform may also act as an interface for allowing a child or student to request additional regular screen time. For example, a child or student may ask their parents/guardians for more screen time when they run out of device or application screen time for the day (e.g. can I have more time on the Xbox or can I have more time on Netflix?). Educational assignment status may be included in the request for more screen time to give the guardian approving or declining the request additional information relating to whether the request is appropriate given the status of the school information, such as but not limited to one or more assignments. In some examples, the parent or guardian may grant additional screen time that is limited to only educational screen time until remaining assignments for the day are turned in.

FIG. 1 depicts details of a screen time management platform 100 in accordance with examples of the present disclosure. The screen time management platform 100 may include a focus time manager 118 which may control or otherwise manage focus time sessions. As an example, an assignment manager of the focus time manager 118 may access an LMS 120 associated with an educational institution. The assignment manager of the focus time manager 118 may access the LMS 120 using a publicly available API for example. The assignment manager of the focus time manager 118 may request assignment information associated with an identifier of a student or child 102 specific to the LMS 120. The identifier may be associated with or otherwise linked to another identifier that is not specific to the LMS 120 but is otherwise associated with a child or student 102. Once the assignment information is retrieved from the LMS 120, an assignment tracking module of the assignment manager may determine if any of the assignments are due in the current day, in the future, or if any assignments are past due. In some examples, assignment information retrieved from the LMS 120 may indicate one or more of a recommended amount of time, a time block), a recommended start time, a recommended stop time, and/or other information related to how a child or student is to complete the assignment. If assignments are outstanding or otherwise due in the future, a focus time scheduler associated with the focus time manager 118 may then automatically schedule a focus time session for an assignment due in the future or for an assignment that is late or otherwise outstanding.

In examples, the focus time scheduler associated with the focus time manager 118 may interface with a calendar associated with the child or student 102. For example, the calendar 122 may indicate that one or more time slots, or blocks of time, are available for scheduling focus time sessions. Accordingly, the focus time scheduler associated with the focus time manager 118 may schedule one or more focus time sessions 124/126 in the calendar 122. A focus time application/device configurator may monitor a calendar associated with the child or student 102 to determine of a focus time session is scheduled to occur in the future.

In examples, the focus time application/device configurator may generate a reminder or otherwise cause a reminder or other communication to be provided to the child or student 102 before a focus time session starts. For example, a child or student 102 may be signed into a user account at one or more devices, applications, or websites; the focus time application/device configurator may generate a reminder or otherwise cause a reminder or other communication to be provided to the account in which the child or student 102 is signed into before the focus time session starts. That is, if a child or student 102 is signed into and using a device/application/video game console 104; a reminder may be displayed at the device/application/video game console 104 informing the child or student 102 that the focus time is about to start. In some examples, one or more of the devices 106 and/or 110 associated with a parent or guardian of the child or student 102, or an identifier associated with the child or student 102, may also receive an indication, for example a communication message 112, informing the parent or guardian that the focus time session for the child or student 102 has begun. In accordance with examples of the present disclosure, screen time of devices, applications, and/or content associated with a user identifier of the child or student 102 may then be limited to categorical content, such as educational content, when the focus time session starts. In some examples, screen time during a focus time session may not count in the child's or student's 102 overall screen time budget for the day. In other instances, the screen time during a focus time session does count against the child's or student's 102 overall screen time budget for the day.

The child or student 102 may complete the outstanding assignment (e.g., assignment due in the future or an assignment that is late) and submit the assignment to the LMS 120. The focus time manager 118 may receive an indication that the assignment has been completed and that there are no outstanding or other assignments due. In some examples, one or more of the devices 106 and/or 110 associated with a parent or guardian of the child or student 102 may also receive a communication informing the parent or guardian that the child or student 102 has completed, submitted, or otherwise turned in an assignment. Accordingly, the focus time application/device configurator of the focus time manager 118 may then disable the focus time session, or otherwise disable the restrictions in place during a focus time session, such that the user goes back to their regular screen time limits.

In accordance with examples of the present disclosure, a child or student 102 may request an extension of screen time. For example, the child or student 102 may exhaust all budgeted or otherwise allowed screen time and may submit a request for additional screen time to the screen time manager associated with the focus time manager 118. The screen time manager associated with the focus time manager 118 may generate a request and send the request to the parents or guardians of the child or student 102. In examples, the request may include assignment information (e.g., whether any assignments are late or due). Accordingly, a parent or guardian can make an informed decision when granting additional screen time.

In accordance with examples of the present disclosure, a parent or guardian may enable a focus time session based on assignment information for the child or student 102. For example, the parent or guardian may access assignment information from the assignment tracker associated with the focus time manager 118; in instances where assignments are due or overdue, the parent or guardian may manually enable a focus time session of a specific or open-ended duration until the child or student 102 completes the assignment.

Figure 2:
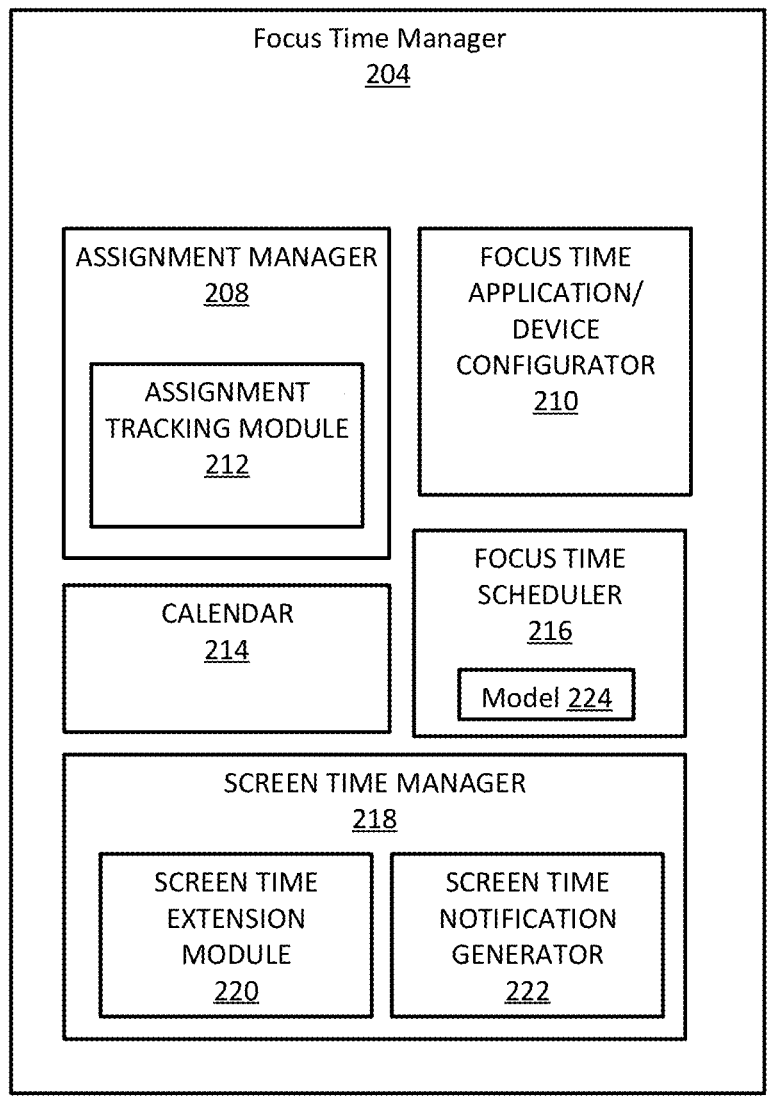
FIG. 2 depicts details of a focus time manager in accordance with examples of the present disclosure.

FIG. 2 depicts details of a focus time manager 204 in accordance with examples of the present disclosure. The focus time manager 204 may include an assignment manager 208, focus time application/device configurator 210, calendar 214, focus time scheduler 216, and/or screen time manager 218. Although each of the assignment manager 208, focus time application/device configurator 210, calendar 214, focus time scheduler 216, and/or screen time manager 218 are depicted as residing within the focus time manager 204, in examples, the assignment manager 208, focus time application/device configurator 210, calendar 214, focus time scheduler 216, and/or screen time manager 218 may be provided in a distributed manner.

The assignment manager 208 may access or otherwise obtain assignment information from an LMS, such as the LMS 120 (FIG. 1) based on a student identifier. An assignment tracking module 212 may determine if any of the received assignments are late or are due for a current day. In examples, if assignments are late or due for that day, the focus time scheduler 216 may schedule a focus time session in a calendar 214 associated with the student identifier. In examples, the calendar 214 may be part of the focus time manager 204 or may be otherwise accessible by the focus time manager 204. Further, the calendar 214 may be a calendar associated with the student identifier or otherwise associated with an identifier linked to the student identifier. For example, a private student identifier may uniquely identify a student or child 102 outside of the LMS 120; an LMS student identifier may uniquely identify the student or child 102 within the LMS 120; accordingly the LMS student identifier may be linked to or otherwise associated with a private student identifier outside of the LMS 120. Example identifiers include a user name, an email address, a security token, etc.

In examples, the focus time scheduler 216 may automatically schedule a focus time session based on an explicit parameter provided by the child or student 102 or may utilize a model when determining a block of time to schedule the focus time session. For example, a child or student 102 may explicitly indicate that they work better on math assignments in the afternoon and/or may indicate that they work better on science assignments in the morning. In examples, a child or student 102 may specifically designate a specific assignment to a period of time (e.g., morning, afternoon, evening, etc.) or the child or student 102 may designate a subject to a period of time (e.g., math→morning, science→evening). Such designations may be learned over time (e.g., the child or student scheduling or moving a focus time session such the focus time session associated with reading are all after lunch) or may be associated with a parameter specified by the child or student 102.

Alternatively, or in addition, the focus time session scheduler 216 may base the scheduling of a focus time session on a child or student specific model 224 whereby work habits and/or indications of completed assignments may determine what time a child or student works best and/or for what duration of time. For example, statistical information including, but not limited to: when an assignment was started/completed, an amount of time required to complete an assignment, a time of day that the assignment was started, a time of day the assignment was finished, activities (e.g., sports, music, meals, etc.) occurring before or after an assignment was started or completed, and/or an availability of a parent, guardian, or group member, may be tracked over time for each assignment completed by the child or student. Such information may be stored in a database accessible by the assignment manager 208, the assignment tracking module 212, and/or the focus time scheduler 216. In examples, a child or student specific model 224 may utilize past statistical information to predict a time for and/or a duration of a focus time session that increases the likelihood that a child or student may complete an assignment in a given amount of time and/or before such assignment is due. Accordingly, the focus time scheduler 216 can receive information associated with an assignment (e.g., subject, expected duration, difficulty level, etc.) from an LMS 120, and generate a focus time session based on the received information. In examples, once the child or student has completed the assignment, the focus time scheduler 216 may receive statistical information associated with the completed assignment and retrain a child or student specific model 224 based on such information. For example, techniques such as fine-tuning and/or transfer learning may be utilized. In examples, the focus time scheduler 216 may include the child or student specific model 224 or the child or student specific model 224 may be at a location other than the focus time manager 204. The focus time application/device configurator 210 may receive an indication that a focus time session is to start. Such an indication may be received from the calendar 214 and/or from a manual initiation, such as from a parent or guardian. The focus time application/device configurator 210 may then retrieve a profile associated with the focus time session and proceed to cause one or more devices and/or applications to be disabled, limited, or otherwise inaccessible by the child or student. In examples, the focus time application/device configurator 210 may limit the content available for access and/or display at a device or application being used by a student or child 102. In some examples, the focus time manager 204 may access an authoritative or administrative capability associated with each of the devices and/or applications used by the student or child 102 to enforce such policy. For example, a user identifier associated with a student or child's 102 account used to sign in to or otherwise enable a gaming console may be managed by an authoritative or administrative account; accordingly, the authoritative or administrative account may limit the content available to the gaming console and/or the functionality of the gaming console during a focus time session. As another example, a child or student 102 may utilize a computing device during the focus time session; however, the content available (e.g., applications and/or content displayed) may be limited by an educational content policy as configured by a parent or guardian. In addition to controlling devices directly used by the student and/or child (e.g., by associating such device/application with a user identifier), the focus time manager 204 may also interface with one or more network elements to limit network access or otherwise filter content that may be displayed at a device/application used by the child or student 102.

Upon submitting an assignment to the LMS 120, the assignment tracking module 212 may verify that the assignment has been properly submitted. The focus time application/device configurator 210 may then disable a focus time session such that the child or student goes back to their regular screen time limits. In examples, the child or student may request a screen time extension. Rather than a parent or guardian blindly approving or denying the request, or asking the child or student about homework, assignments, school etc., a screen time extension module 220 of the screen time manager 218 may retrieve assignment and progress information from the assignment tracking module 212 and assemble the information using the screen time notification generator 222. The screen time notification generator 222 may provide the assembled information to an approving parent or guardian. In examples, the parent or guardian may view the child's or student's 102 performance and then can approve or disapprove the request for additional screen time.

Figure 3:
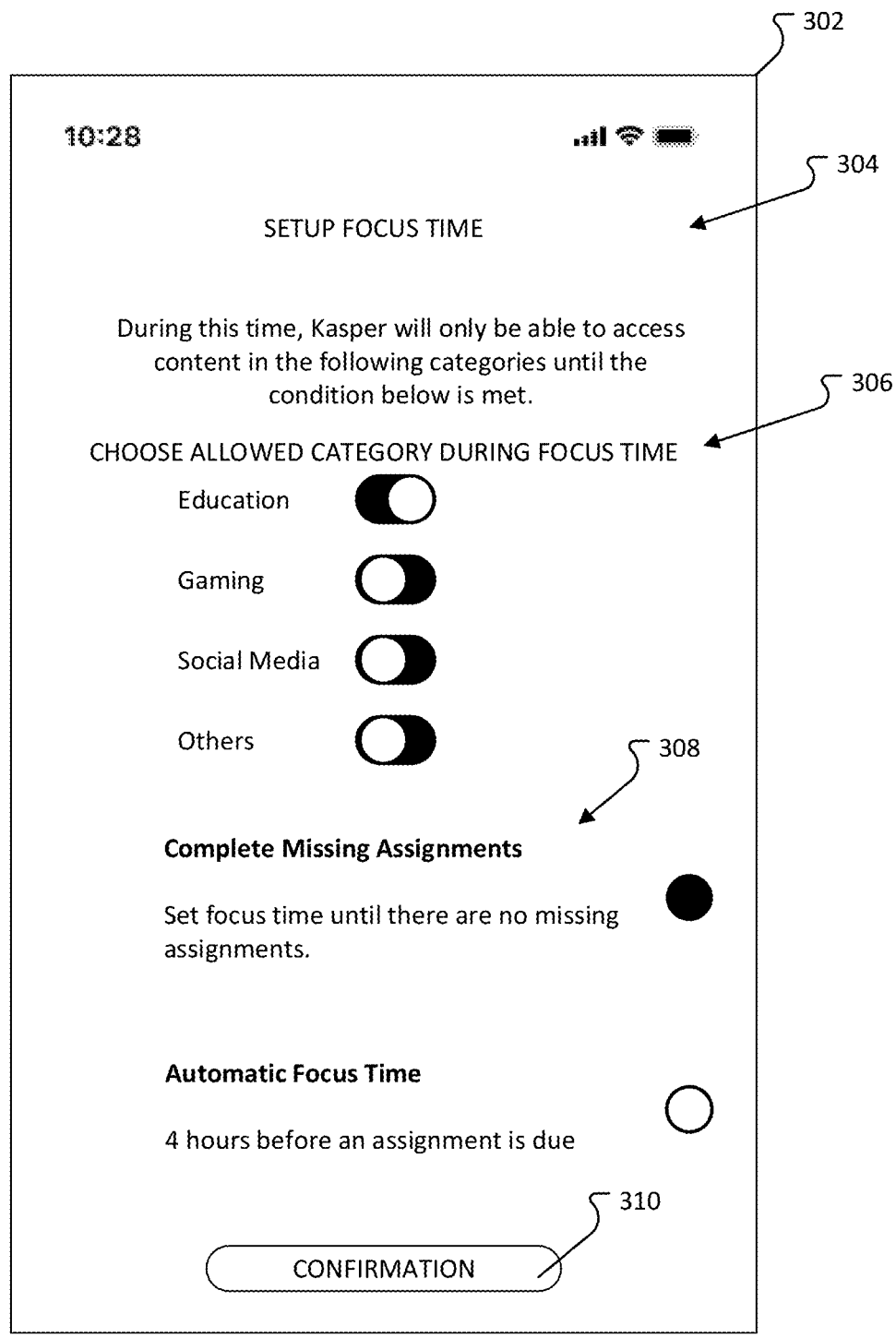
FIG. 3 depicts details of a user interface in accordance with examples of the present disclosure.

FIG. 3 depicts details of a user interface 302 in accordance with examples of the present disclosure. The user interface 302 depicts various elements associated with configuring a focus time session. In examples, additional elements or configurable items may be included in the user interface 302. The user interface 302 may display a customized message 304 specific to a child or student 102 informing a parent or guardian as to how the focus time session is to be configured. As an example, the user interface 302 may display category selection controls 306; the category selection controls 306 may allow a parent or guardian to specifically limit the type of content and/or devices that are available to the child or student during a focus time session. For example, education content and/or devices associated with an education category may be enabled during the focus time session. As another example, social media content or devices associated with social media (e.g., a smartphone) may be disabled during the focus time session. As yet another example, gaming content and/or devices associated with a gaming content category (e.g., gaming console) may be disabled during a focus time session. The user interface 302 may also allow a user to control how the focus time session is enabled. For example, the focus time enablement selection area 308 may allow a parent or guardian to initiate the focus time session automatically until there are no outstanding or otherwise late assignments. Alternatively, or in addition, the focus time enablement selection area 308 may allow a parent or guardian to select an option such that the focus time manager 204 (FIG. 2) automatically schedules a focus time session a user configurable amount of time before the assignment is due. The parent or guardian may then confirm the configurations with the selection of the confirmation control 310.

In some examples, configuration information not depicted in FIG. 3 may be used to configure a focus time session. For example, a recommended focus time schedule may be provided by educators or other trusted parties; such recommended focus time schedule may be selected by an individual configuring the focus time session. In examples, the recommended focus time schedule is not limited to time block recommendations. For example, the recommended focus time schedule may also include information specific to a type of apps, a type of website, content that is permitted or excluded during a focus time. Alternatively, or in addition, the selected schedule may account for an automatic and temporary disabling of the focus time session to not interfere with reasonable device usage. For example, if a child missed an assignment, the focus time session may be disabled such that a child does not miss out on a whole weekend of device usage. As another example, applications or device usage may be enabled when there's a scheduled class social group even though there's an outstanding assignment or other school criteria that would otherwise enable a focus time session. Alternatively, or in addition, a focus time session may take into account past trends and generate an automatic focus time recommendation. For example, if a first child rarely misses assignments but a second child often has overdue assignments, the focus time associated with the second child may be automatically increased while the focus time associated with the first child may stay the same or may even be automatically decreased.

Figure 4:
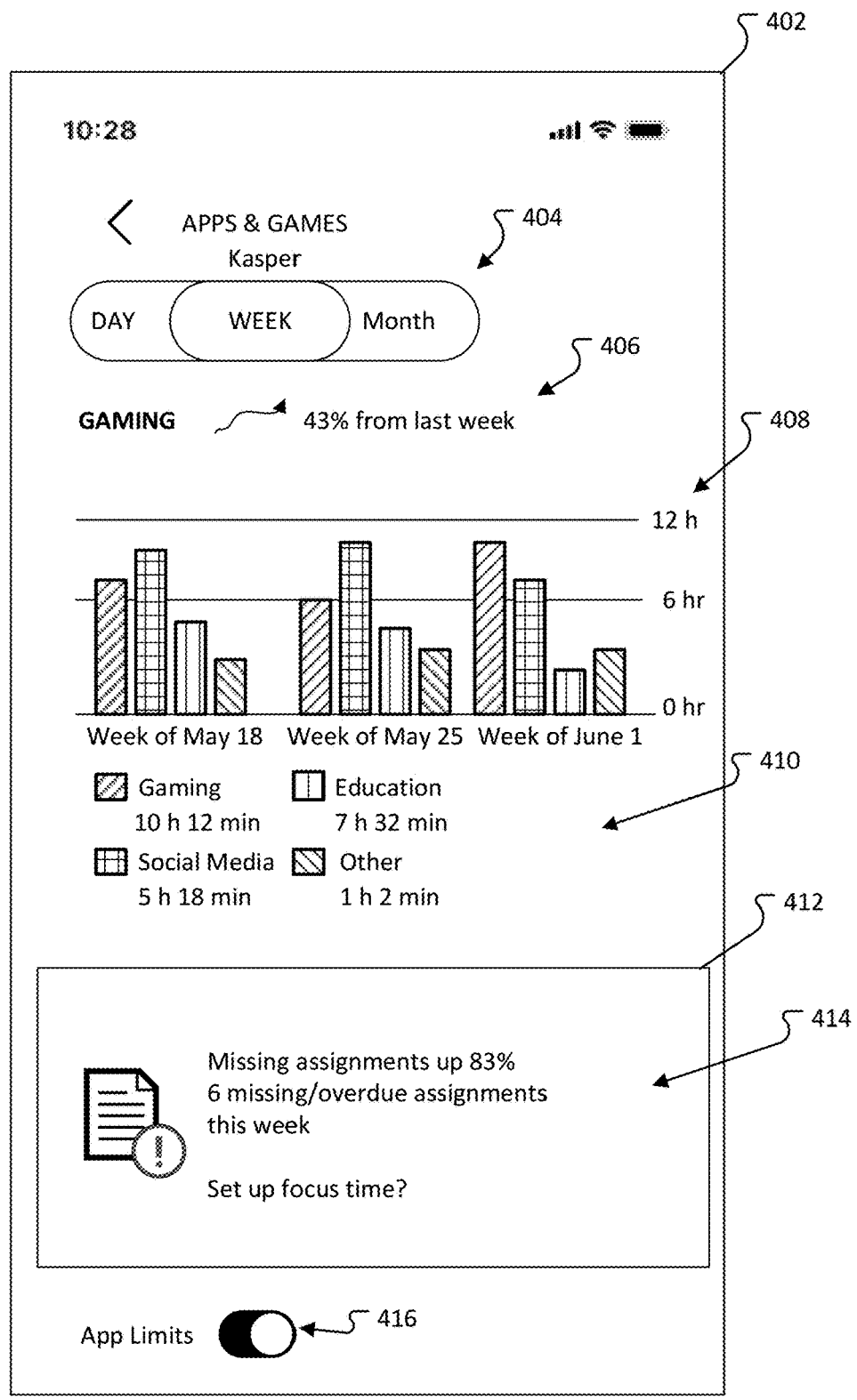
FIG. 4 depicts details of a performance information user interface in accordance with examples of the present disclosure.

FIG. 4 depicts details of a performance information user interface 402 in accordance with examples of the present disclosure. The performance information user interface 402 may display additional performance information about a child or student's progress over a selectable time period 404. In examples, based on a selected time period 404, summary information 406 specific to the performance of the child or student may be displayed, where the summary information 406 may indicate a prevalent usage category of screen content. Additional historical information 408 may indicate or otherwise illustratively display the child's or student's usage of screen content segmented by category. In addition, the area 410 may indicate a total amount of time the child or student has spent on such information.

In accordance with examples of the present disclosure, the performance information user interface 402 may also display missing assignment information 412 including details 414 relating to a number or increase in the number of missing assignments. Further, a user may be prompted to setup a focus time based on the missing assignment information 412. In some examples, the performance information user interface 402 may allow a parent or guardian to manually enable or disable an open ended focus time session using the control 416. For example, a parent or guardian, seeing that there are six missing assignments, may enable a focus time session for a period of time using the control 416.

Figure 5:
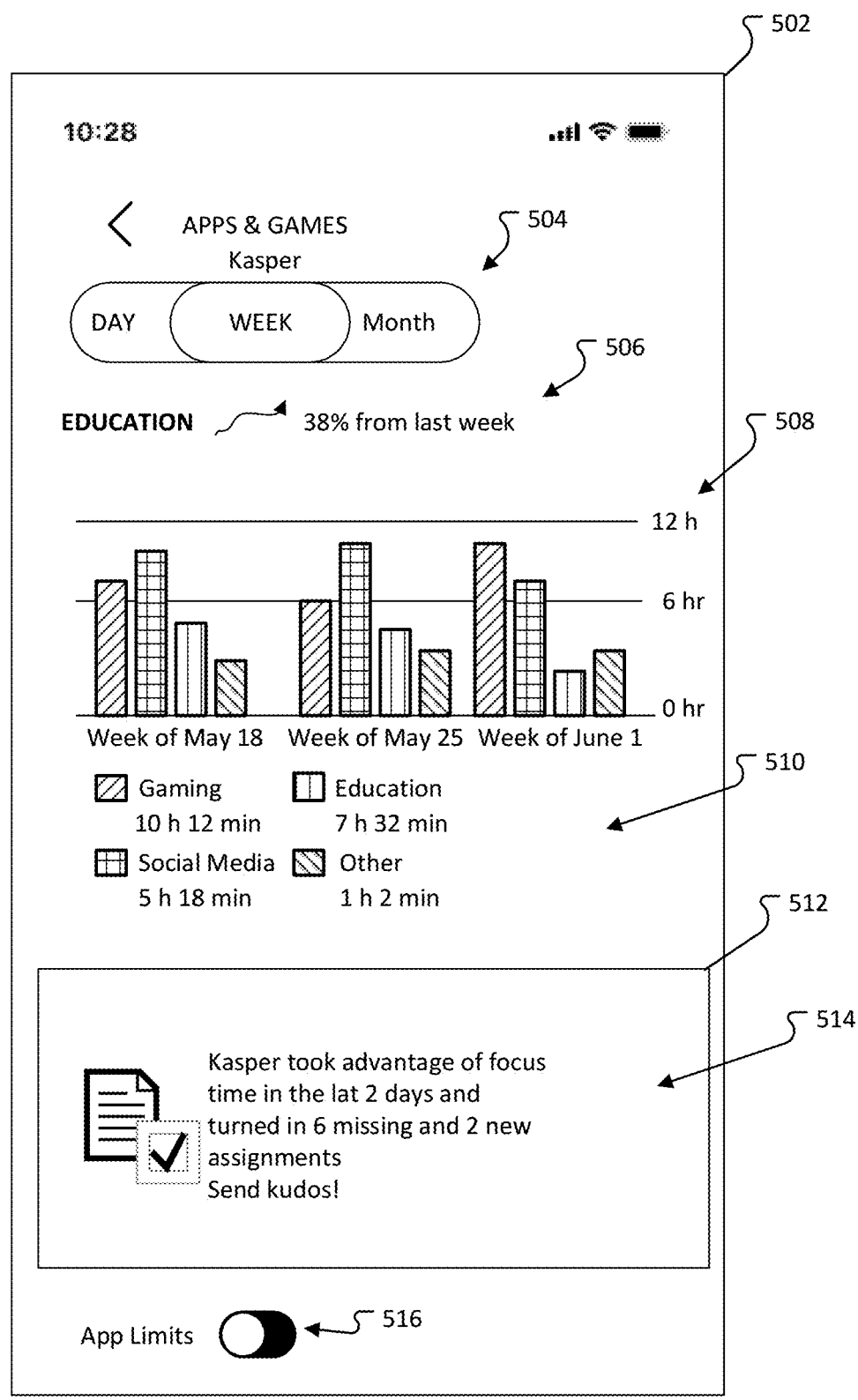
FIG. 5 depicts details of a performance information user interface in accordance with examples of the present disclosure.

FIG. 5 depicts details of a performance information user interface 502 in accordance with examples of the present disclosure. The performance information user interface 502 may display additional performance information about a child or student's 102 progress over a selectable time period 504. In examples, based on a selected time period 504, summary information 506 specific to the performance of the child or student 102 may be displayed, where the summary information 506 may indicate a prevalent usage category of screen content. Additional historical information 508 may indicate or otherwise illustratively display the child's or student's 102 usage of screen content segmented by category. In addition, the area 510 may indicate a total amount of time the child or student has spent viewing such information.

In accordance with examples of the present disclosure, the performance information user interface 502 may also display status information 512 with details 541 related to the child's or student's 102 performance. The child's or student's performance 514 may indicate that all assignments, a threshold number of assignments, or a threshold percentage of assignments have been turned in and the child or student 102 is up to date with all or a threshold amount of assignment information. In some examples, the performance information user interface 502 may allow a parent or guardian to manually enable or disable an open ended focus time session using the control 516. For example, parent or guardian, seeing that the child or student 102 is up to date without any missing assignments, may disable a focus time session for a period of time using the control 516.

Figure 6:
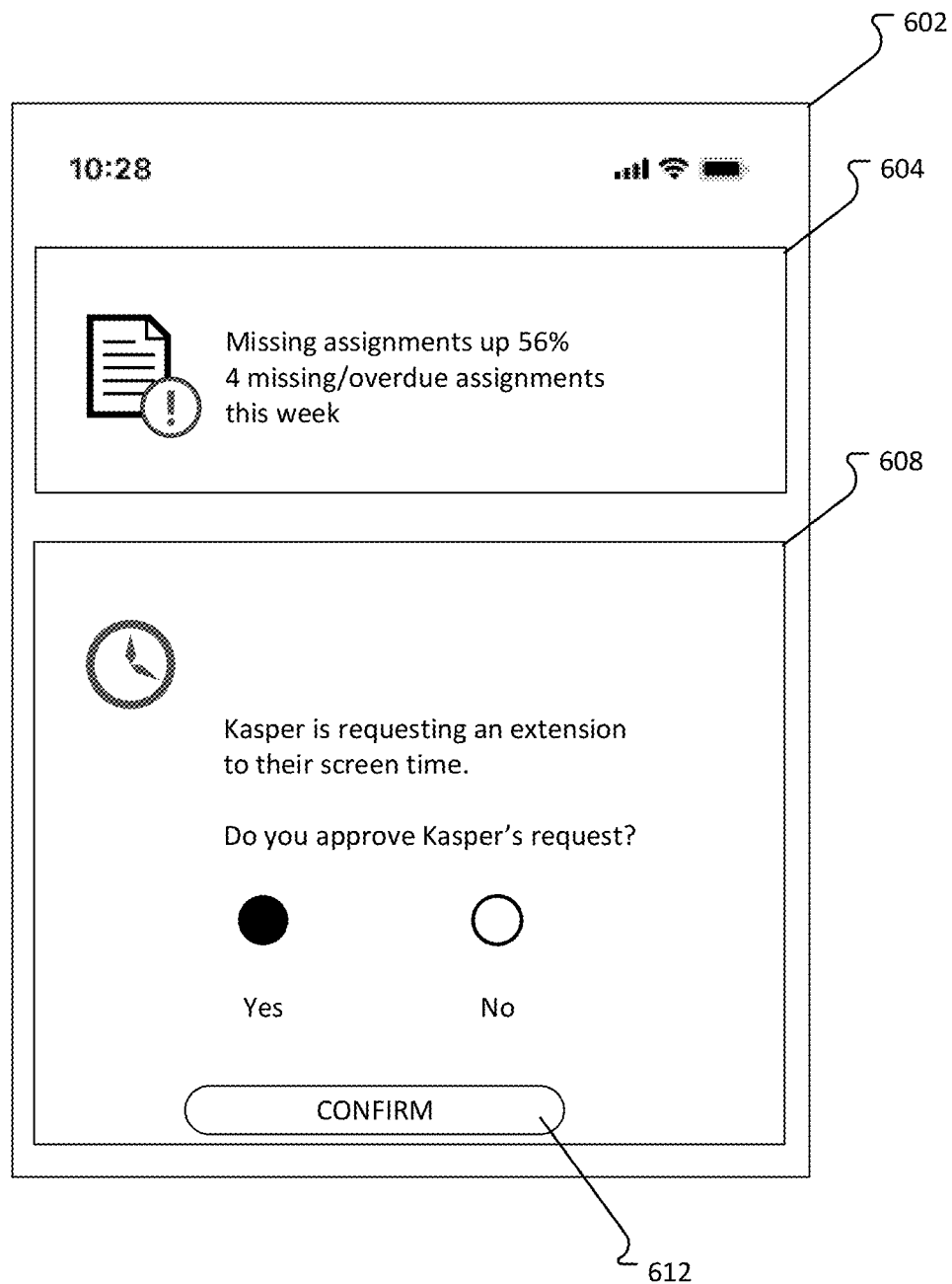
FIG. 6 depicts details of a user interface in accordance with examples of the present disclosure.

FIG. 6 depicts details of a user interface 602 in accordance with examples of the present disclosure. The user interface 602 may display an example message 604 and/or 608. In examples, the message 604 may include missing assignment status information for a child or student 102. For example, the message 604 may indicate that there are four missing or overdue assignments for a specific period of time. The message 604 may be a periodic status update message sent to a device associated with a parent or guardian of the child or student 102. The message 604 may include soon-to-be-due assignment information. For example, the message 604 may indicate that there are two yet-to-be submitted assignments that are due in the next two hours. In other examples, the message 604 may be sent to a device associated with a parent or guardian of the child or student in response to a request by the child or student for an extension of screen time. For example, the child or student may request an extension of screen time; the focus time manager 204 may cause a message 608 to be sent to the device or application associated with a parent or guardian. Though the message 604 and 608 are depicted as being separate messages, the information included in messages 604 and 608 may be provided as a single message. Accordingly, a parent or guardian may approve the child's or student's 102 request for additional screen time based on the information in the message 604. Thus, the parent or guardian may confirm the extension of screen time selection using the confirm control 612.

Figure 7:
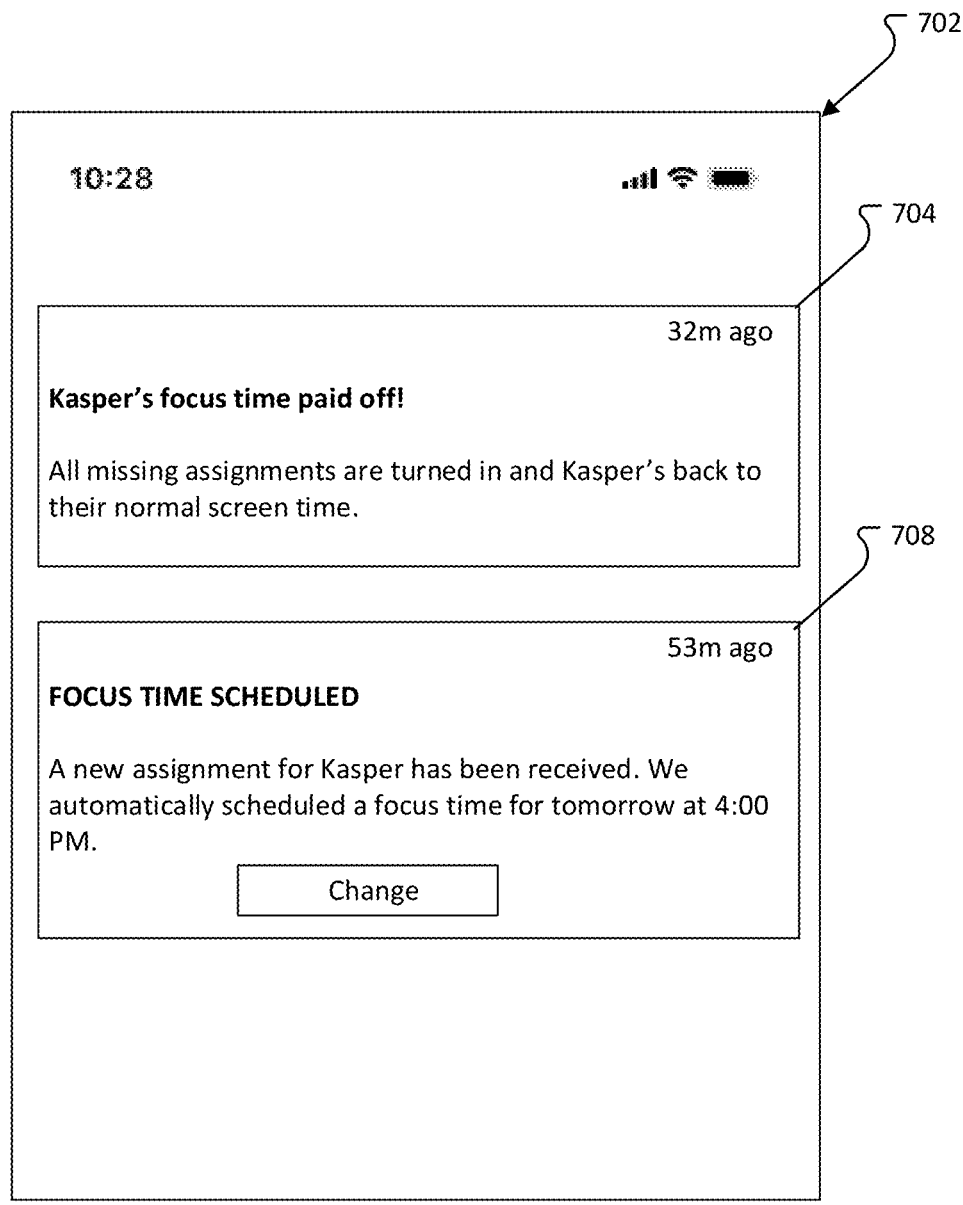
FIG. 7 depicts details of another user interface in accordance with examples of the present disclosure.

FIG. 7 depicts details of a user interface 702 in accordance with examples of the present disclosure. The user interface 702 may display an example message 704 and/or 708. In examples, the message 704 may be provided to a device associated with a parent or guardian upon the submission or completion of an assignment. For example, the assignment manager 208 may receive information from the LMS 120 indicating that a child or student turned in an assignment. The assignment manager 208 may then cause the message 704 to be provided to a device associated with a parent or guardian of the child or student 102 and/or a device associated with a user identifier associated with the child or student 102.

In accordance with examples of the present disclosure, the message 708 may be provided to a device associated with a parent or guardian of a child or student and/or may be provided to a device associated with the child or student. The message 708 may indicate that a new assignment has been received by the assignment manager 208 for example, and that the focus time scheduler 216 has automatically scheduled a focus time session on the calendar 214. Of course, the parent or guardian and/or the child or student 102 may change the scheduled focus time session using a change control option depicted in FIG. 7.

Figure 8:
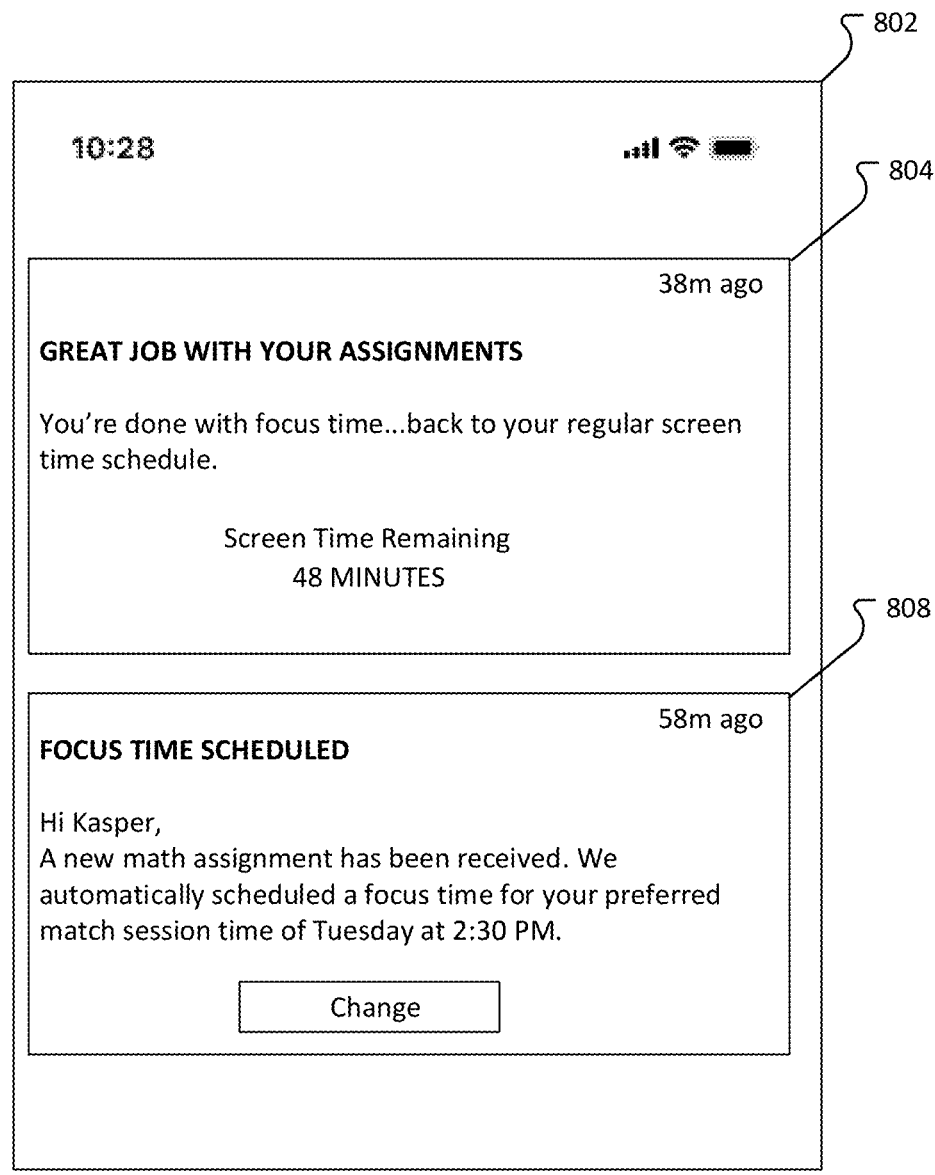
FIG. 8 depicts details of yet another user interface in accordance with examples of the present disclosure.

FIG. 8 depicts details of a user interface 802 in accordance with examples of the present disclosure. The user interface 802 may display an example message 804 and/or 808. In examples, the message 804 may be provided to a device associated with a child or student 102 and/or a parent or guardian upon the completion of an assignment and/or upon completion of a focus time session. In some examples, the message 804 may also include an amount of the remaining screen time for the child or student.

In accordance with examples of the present disclosure, the message 808 may be provided to a device associated with a parent or guardian of a child or student 102 and/or may be provided to a device associated with the child or student 102. The message 808 may indicate that a new assignment has been received by the assignment manager 208 for example, and that the focus time scheduler 216 has automatically scheduled a focus time session on the calendar 214. In examples, the focus time scheduler 216 may indicate that the child or student 102 has a preferred focus time session that may be specific to a type or subject of the assignment. The preferred focus time session may be explicitly indicated by the child or student or may be determined according to a child or student specific model.

For example, the child or student may explicitly indicate that they work better on math assignments in the afternoon and/or may indicate that they work better on science assignments in the morning. In examples, a child or student may specifically designate a specific assignment to a period of time (e.g., morning, afternoon, evening, etc.) or the school or child may indicate designate a subject to a period of time (e.g., math→morning, science→evening). Such designations may be learned over time (e.g., the child or student scheduling or moving a focus time session such the focus time session associated with a "reading" subject are all after lunch) or may be associated with a parameter specified by the child or student 102.

Alternatively, or in addition, the focus time session scheduling may be based on a user specific model whereby work habits and/or indications of completed assignments may determine what time a child or student 102 works best and/or for what duration of time. For example, statistical information including, but not limited to: when an assignment was started/completed, an amount of time required to complete an assignment, a time of day that the assignment was started, a time of day the assignment was finished, activities (e.g., sports, music, meals, etc.) occurring before or after an assignment was started or completed, and/or an availability of a parent, guardian, or group member, may be tracked over time for each assignment completed by the child or student. Such information may be stored in a database accessible by the child or student specific model 224 (FIG. 2). As previously described, the child or student specific model 224 (FIG. 2) may utilize past statistical information to predict a time for and/or a duration of a focus time session that increases the likelihood that a child or student 102 may complete an assignment in a given amount of time and/or before such assignment is due. Accordingly, the focus time scheduler 216 (FIG. 2) can receive information associated with an assignment (e.g., subject, expected duration, difficulty level, etc.) from an LMS 120 (FIG. 1), and generate a focus time session based on the received information. In examples, once the child or student 102 has completed the assignment, the focus time scheduler 216 (FIG. 2) may receive statistical information associated with the completed assignment and retrain a child or student specific model 224 based on such information. Accordingly, such a focus session may be scheduled and/or may change over time based on one or more subjects, assignments, and/or events occurring before a focus time session is to be scheduled. As another example, on Mondays, the child or student 102 may have a training session such that a focus time session is not optimal at 2:30. Accordingly, the focus time session may be scheduled by taking into account other events affecting a child or student's ability to focus.

Figure 9A:
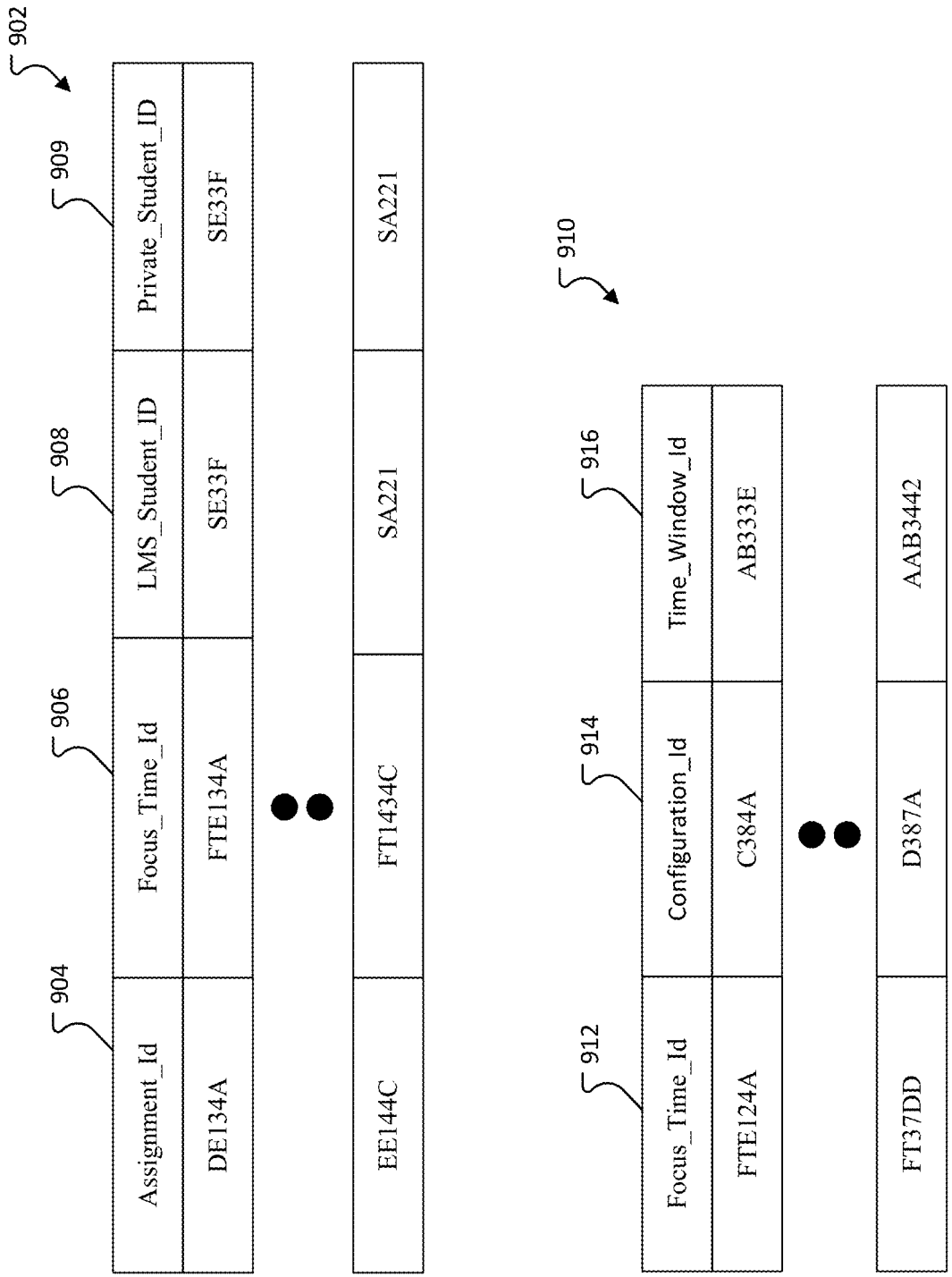
FIGS. 9A-9B depict example data structures in accordance with examples of the present disclosure.
Figure 9B:
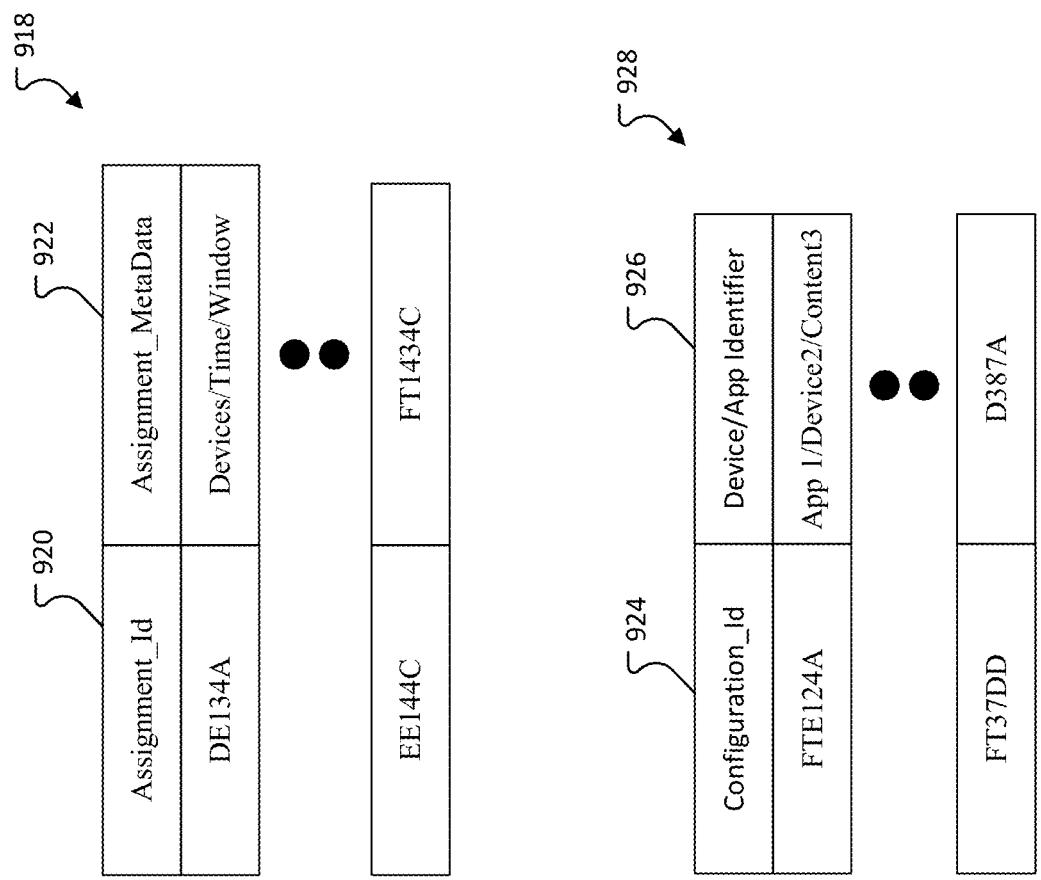

FIGS. 9A and 9B depict example data structures 902, 910, 918, and 928 in accordance with examples of the present disclosure. The example data structure 902 may include an assignment identifier 904, a focus time identifier 906, a student identifier 908, and a private student identifier 909. The student identifier 908 may be an LMS student identifier whereas the student identifier 909 may be a private student identifier. As an example, a private student identifier 909 may uniquely identify a student or child 102 outside of an LMS 120 (FIG. 1). For example, the private student identifier 909 may be a username for an email account, gaming platform, website, portal, etc., while an LMS student identifier 908 uniquely identifies the student or child 102 within the LMS 120 (FIG. 1). Accordingly, the LMS student identifier 908 may be linked to or otherwise associated with the private student identifier 909 via the data structure 902. Examples of the student identifiers include but are not limited to: a user name, an email address, a security token, etc.

Accordingly, an assignment may be received from an LMS and may be associated with a specific focus time session and child or student 102. In examples, the focus time identifier 912 in the data structure 910 may link the assignment identifier 904 to a device/application configuration identifier 914, where the device/application configuration identifier 914 may identify a category of content, devices, or applications to be enabled or disabled by the focus time application/device configurator 210 for example. In examples, the time window identifier 916 may identify a date, day, time, and/or duration of time etc., associated with a particular focus time identifier 913.

The data structure 918 may include assignment metadata 922 associated with an assignment identifier 920. The assignment metadata 922 may include information provided by a parent/guardian and/or teacher/instructor specifying devices to be used (e.g., a category of devices for example), a preferred time of day, and/or a preferred block of time or window of time for completing an assignment associated with the assignment in the assignment identifier field 920. Similarly, the configuration identifier 924 in the data structure 928 may specifically identify one or more apps, devices, and/or content 926 that is to be enabled or disabled when a focus time session is enabled/disabled. While the data structures of FIGS. 9A and 9B depict various fields and an organization of information, other data structures and other organization mechanisms may be employed.

Figure 10:
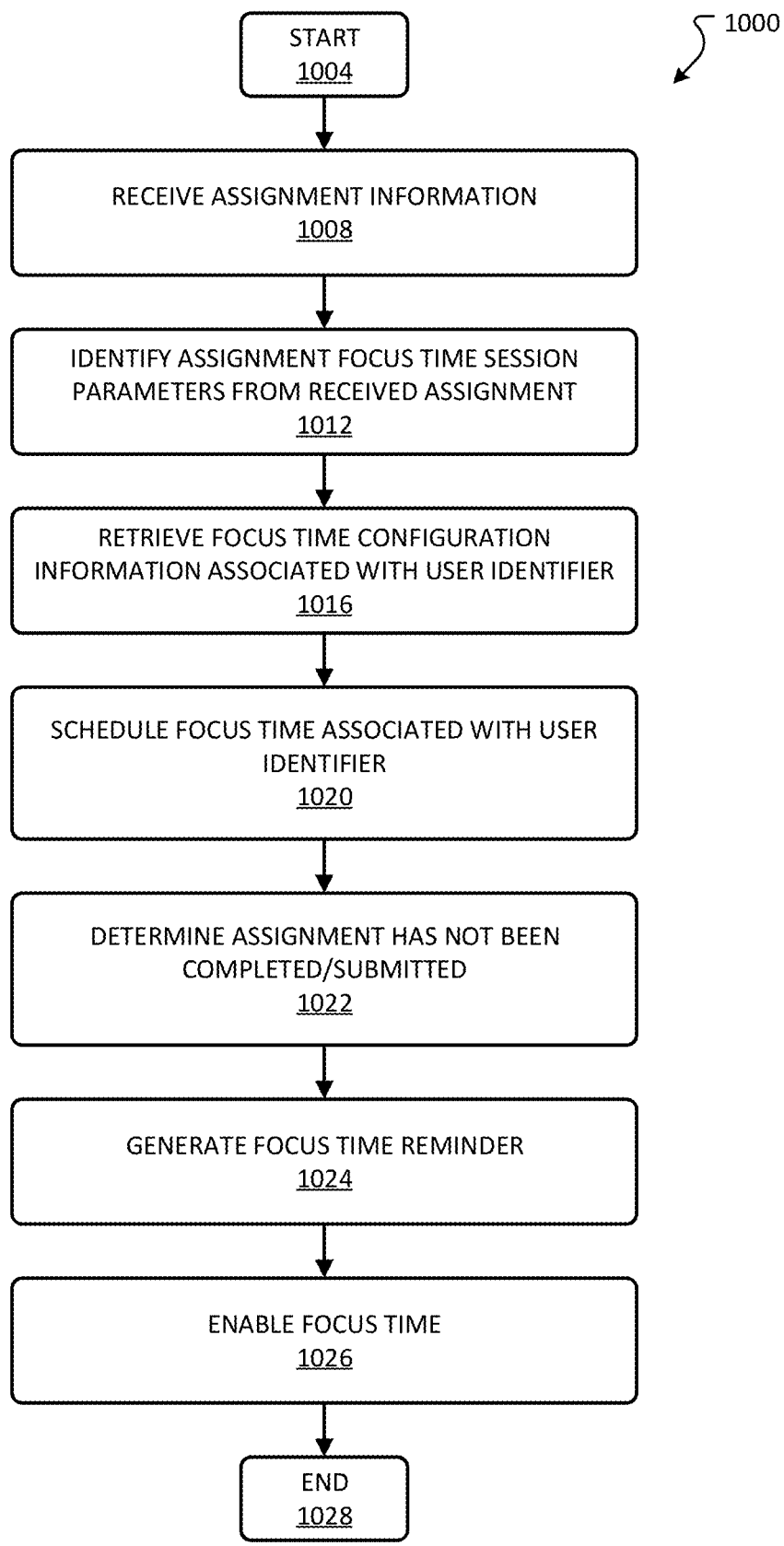
FIG. 10 depicts details of a method for enabling a focus time session in accordance with examples of the present disclosure.

FIG. 10 depicts details of a method 1000 for enabling a focus time session in accordance with examples of the present disclosure. A general order for the steps of the method 1000 is shown in FIG. 10. Generally, the method 1000 starts at 1004 and ends at 1028. The method 1000 may include more or fewer steps or may arrange the order of the steps differently than those shown in FIG. 10. The method 1000 can be executed as a set of computer-executable instructions executed by a computer system and encoded or stored on a computer readable medium. In examples, aspects of the method 1000 are performed by one or more processing devices, such as a computer or server. Further, the method 1000 can be performed by gates or circuits associated with a processor, Application Specific Integrated Circuit (ASIC), a field programmable gate array (FPGA), a system on chip (SOC), a neural processing unit, or other hardware device. Hereinafter, the method 1000 shall be explained with reference to the systems, components, modules, software, data structures, user interfaces, etc. described in conjunction with FIGS. 1-9.

The method starts at 1004, where flow may proceed to 1008. At 1008, assignment information may be received. For example, the assignment manager 208 may query an LMS 120 with an LMS student identifier. The LMS 120 may respond with a plurality of assignments such that the assignment tracking module 212 may determine if one or more assignments are late or are due in the future. In some examples, the information provided by the LMS 120 may be late assignments only. The method 1000 may proceed to 1012 where one or more assignment focus session parameters may be identified or otherwise determined. For example, an assignment may be associated with a preferred time duration for a focus time session. For instance, a math assignment may include metadata indicating that the assignment should be completed in thirty minutes. Accordingly, at least one parameter may be a focus time session duration equal to thirty minutes. Other parameters include, but are not limited to, a preferred date and/or a preferred time of day.

The method 1000 may proceed to 1016 where focus time configuration information may be retrieved. The focus time configuration information may indicate what types of content, apps, and/or devices are enabled or disabled during a focus time session for a specific focus time session. In examples, content, apps, and/or devices within an education category may be enabled while content, apps, and/or devices within a gaming category may be disabled. The method 1000 may proceed to 1020, where a focus time session may be scheduled. The focus time session may be scheduled by the focus time scheduler 216 for example and may be associated with a user identifier and/or calendar associated with the user identifier. The method 1000 may proceed to 1022, where at a configurable amount of time before the scheduled focus time session, a focus time manager 204 may determine that an assignment is still incomplete or otherwise has not been submitted. Accordingly, the focus time manager 204 may cause a reminder to be sent to a device associated with the child or student and/or a parent or guardian of the child or student at 1024. The method 1000 may proceed to 1026, where the focus time session may be enabled such that content, apps, and/or devices associated with the focus time configuration information are enabled and/or disabled. The method may end at 1028.

Figure 11:
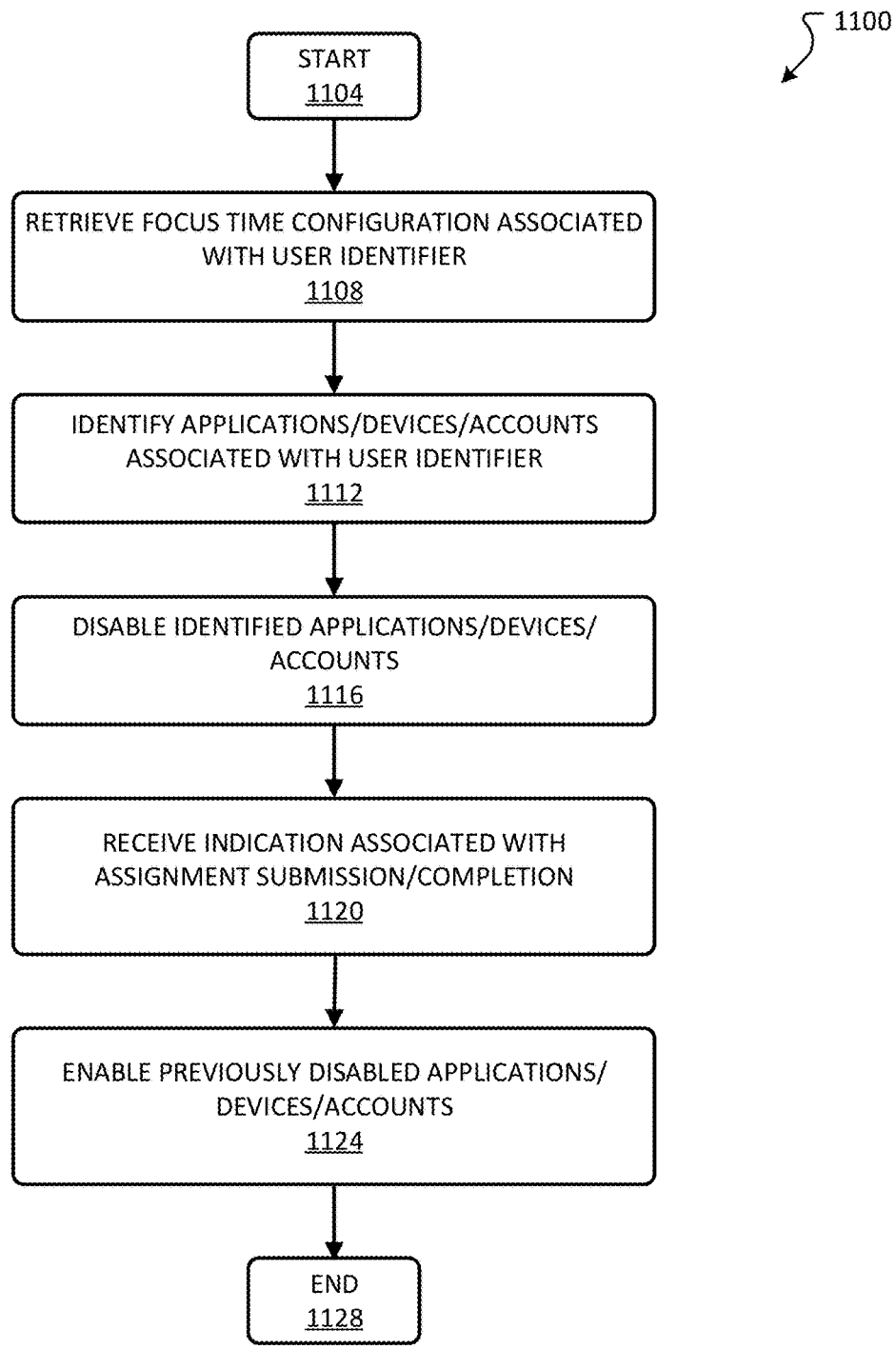
FIG. 11 depicts details of a method for enabling a focus time session and disabling the focus time session in accordance with examples of the present disclosure.

FIG. 11 depicts details of a method 1100 for enabling a focus time session and disabling the focus time session in accordance with examples of the present disclosure. A general order for the steps of the method 1100 is shown in FIG. 11. Generally, the method 1100 starts at 1104 and ends at 1128. The method 1100 may include more or fewer steps or may arrange the order of the steps differently than those shown in FIG. 11. The method 1100 can be executed as a set of computer-executable instructions executed by a computer system and encoded or stored on a computer readable medium. In examples, aspects of the method 1100 are performed by one or more processing devices, such as a computer or server. Further, the method 1100 can be performed by gates or circuits associated with a processor, Application Specific Integrated Circuit (ASIC), a field programmable gate array (FPGA), a system on chip (SOC), a neural processing unit, or other hardware device. Hereinafter, the method 1100 shall be explained with reference to the systems, components, modules, software, data structures, user interfaces, etc. described in conjunction with FIGS. 1-10.

The method starts at 1104, where flow may proceed to 1108. At 1108, a focus time configuration associated with a user identifier may be retrieved. For example, in response to a scheduled time for a focus time session, a focus time configuration may be received. The focus time configuration may include one or more categories of content, apps, devices, that are to be enabled or disable during a focus time session. Thus, at 1112, one or more of the apps and/or devices associated the received user identifier may be identified. For example, a user account associated with a gaming console may be identified based on the user identifier received at 1108. Accordingly, at 1116, the identified applications and/or devices may be disabled.

In accordance with examples of the present disclosure, when a child or student 102 submits one or all outstanding assignments or a focus time session has passed, an indication of such event may be received at the focus time manager 204 at 1120. Accordingly, at 1124, the applications and/or devices previously disabled at 1116 may be enabled at 1124. Thus, the child or student may go back to their regular screen time limits as managed by the screen time manager 218 for example.

Figure 12:
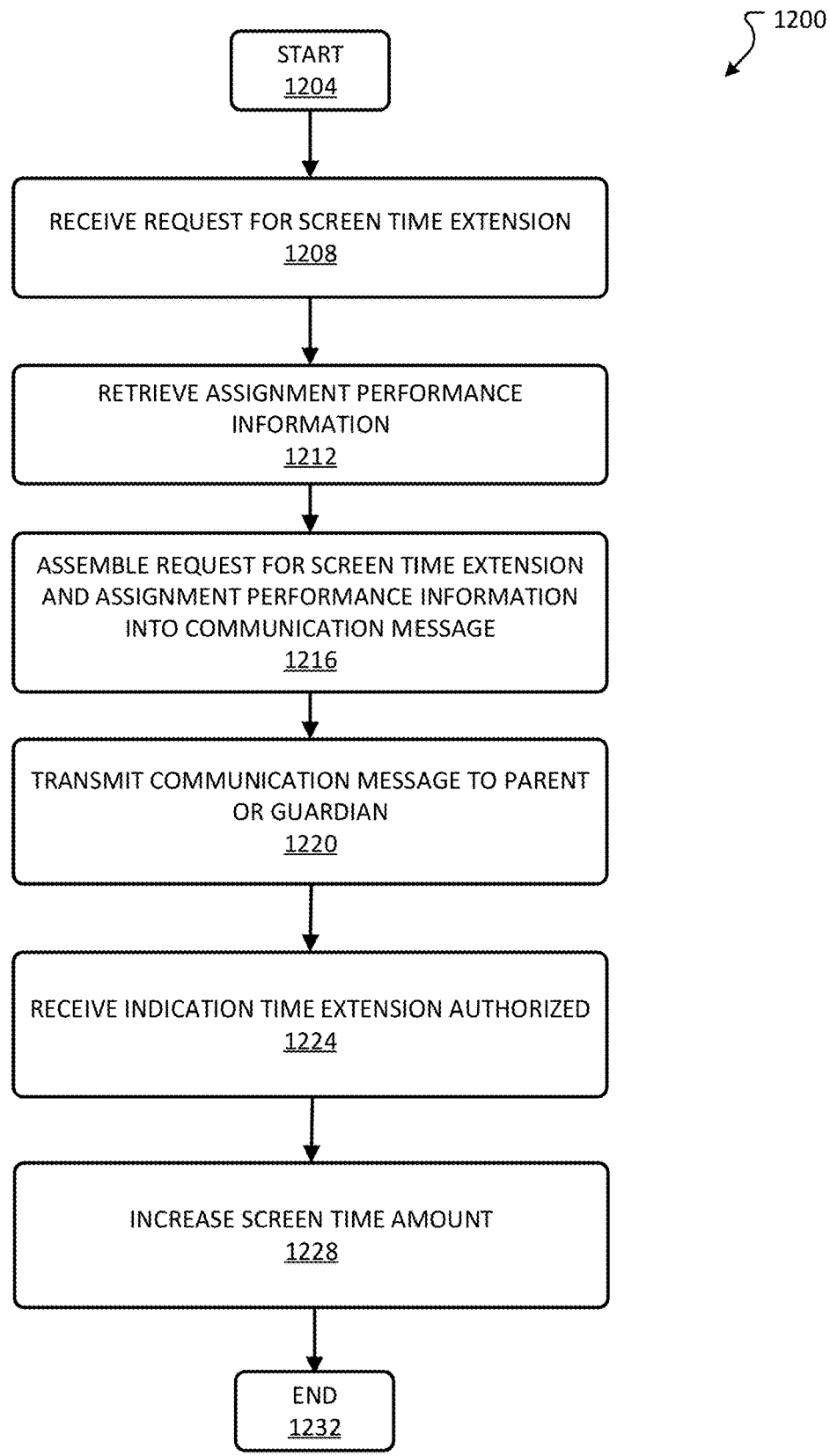
FIG. 12 depicts details of a method for requesting additional screen time in accordance with examples of the present disclosure.

FIG. 12 depicts details of a method 1200 for requesting additional screen time in accordance with examples of the present disclosure. A general order for the steps of the method 1200 is shown in FIG. 12. Generally, the method 1200 starts at 1204 and ends at 1232. The method 1200 may include more or fewer steps or may arrange the order of the steps differently than those shown in FIG. 12. The method 1200 can be executed as a set of computer-executable instructions executed by a computer system and encoded or stored on a computer readable medium. In examples, aspects of the method 1200 are performed by one or more processing devices, such as a computer or server. Further, the method 1200 can be performed by gates or circuits associated with a processor, Application Specific Integrated Circuit (ASIC), a field programmable gate array (FPGA), a system on chip (SOC), a neural processing unit, or other hardware device. Hereinafter, the method 1200 shall be explained with reference to the systems, components, modules, software, data structures, user interfaces, etc. described in conjunction with FIGS. 1-11.

The method starts at 1204, where flow may proceed to 1208. At 1208, a request for additional screen time may be received. For example, a child or student may request additional screen time because they have exhausted all screen time in their current screen time budget. In examples, the request may be received at the focus time manager 204 for example. The method 1200 may proceed to 1212 where performance information may be retrieved. In examples, the performance information may correspond to historical performance of the child or student over a period of time, such as a week for example. At 1216, the focus time manager 204 may assemble a request for a screen time extension together with the assignment performance information and place the request and information into a message. Accordingly, at 1220, the message may be transmitted to a device associated with a parent or guardian of the child or student. At 1224, the focus time manager 204 may receive an indication that the time extension was authorized. Accordingly, the screen time amount associated with the user may be increased at 1228. The method 1200 may end at 1232.

Figure 13:
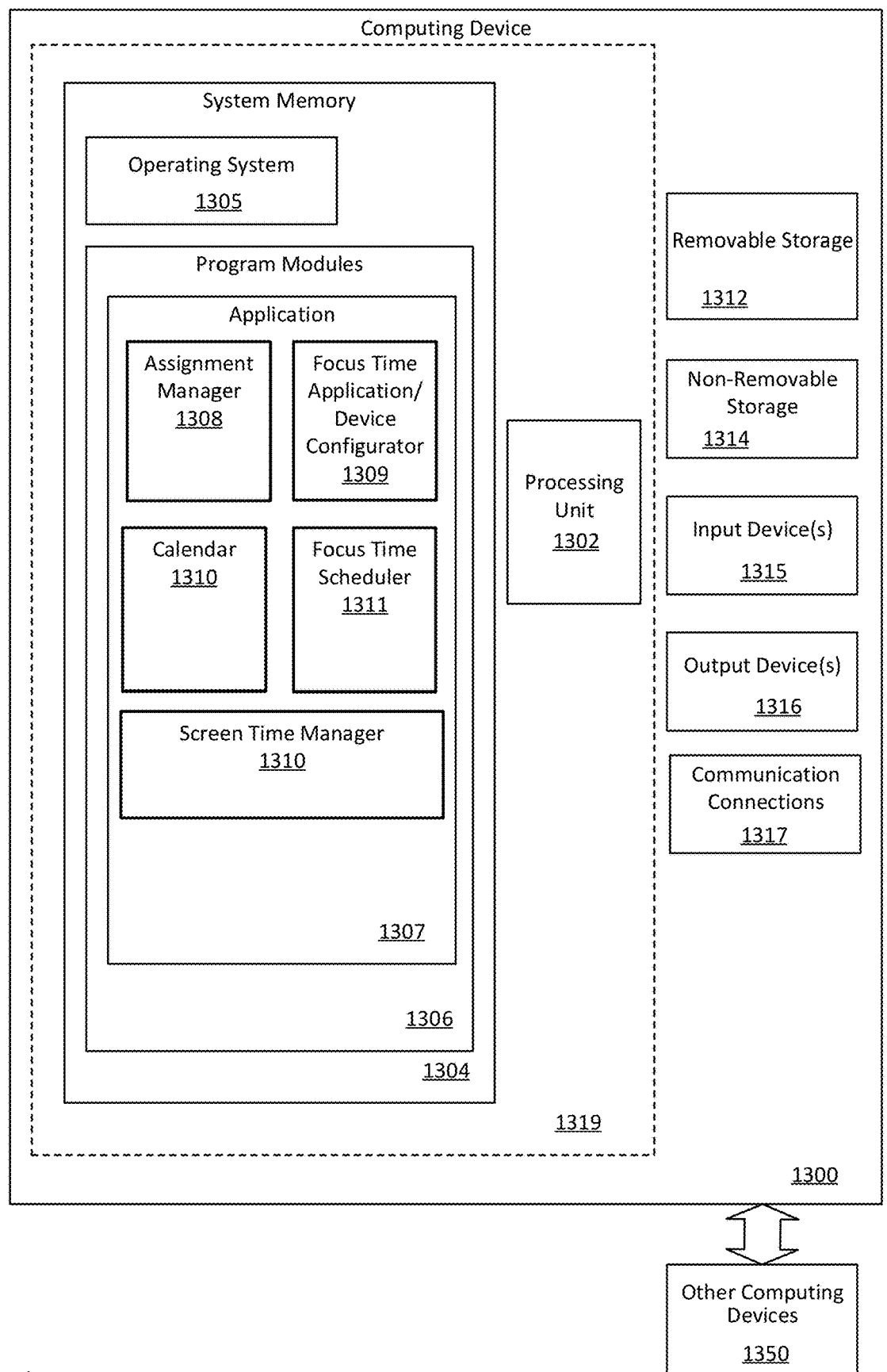
FIG. 13 depicts a block diagram illustrating physical components of a computing system with which aspects of the disclosure may be practiced.

FIG. 13 is a block diagram illustrating physical components (e.g., hardware) of a computing system 1300 with which aspects of the disclosure may be practiced. The computing system components described below may be suitable for the computing and/or processing devices described above. In a basic configuration, the computing system 1300 may include at least one processing unit 1302 and a system memory 1304. Depending on the configuration and type of computing system, the system memory 1304 may comprise, but is not limited to, volatile storage (e.g., random-access memory (RAM)), nonvolatile storage (e.g., read-only memory (ROM)), flash memory, or any combination of such memories.

The system memory 1304 may include an operating system 1305 and one or more program modules 1306 suitable for running software application 1320, such as one or more components supported by the systems described herein. As examples, system memory 1304 may include the assignment manager 1308, the focus time application/device configurator 1309, the calendar 1310, the focus time scheduler 1311, and/or the screen time manager 1318. The assignment manager 1308 may be the same as or similar to the assignment manager 208 previously described. The focus time application/device configurator 1309 may be the same as or similar to the focus time application/device configurator 210 previously described. The calendar 1310 may be the same as or similar to the calendar 214 previously described. The focus time scheduler 1311 may be the same as or similar to the focus time scheduler 216 previously described. The screen time manager 1318 may be the same as or similar to the screen time manager 218 previously described. The operating system 1305, for example, may be suitable for controlling the operation of the computing system 1300.

Furthermore, examples of the disclosure may be practiced in conjunction with a graphics library, other operating systems, or any other application program and are not limited to any particular application or system. This basic configuration is illustrated in FIG. 13 by those components within a dashed line 1319. The computing system 1300 may have additional features or functionality. For example, the computing system 1300 may also include additional data storage devices (removable and/or non-removable) such as magnetic disks, optical disks, or tape. Such additional storage is illustrated in FIG. 13 by a removable storage device 1312 and a non-removable storage device 1314.

As stated above, a number of program modules and data files may be stored in the system memory 1304. While executing on the processing unit 1302, the program modules 1306 (e.g., software applications 1307) may perform processes including, but not limited to, the aspects as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, examples of the disclosure may be practiced in an electrical circuit, discrete electronic elements, packaged or integrated electronic chips containing logic gates, a circuit utilizing a microprocessor, or on a single chip containing electronic elements or microprocessors. For example, some instances of the disclosure may be practiced via a system-on-a-chip (SOC) where each or many of the components illustrated in FIG. 13 may be integrated onto a single integrated circuit. Such a SOC device may include one or more processing units, graphics units, communications units, system virtualization units, and various applications functionality, all of which are integrated (or "burned") onto the chip substrate as a single integrated circuit. When operating via a SOC, the functionality described herein, with respect to the capability of the client to switch protocols, may be operated via application-specific logic integrated with other components of the computing system 1300 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general-purpose computer or in any other circuits or systems.

The computing system 1300 may also have one or more input device(s) 1315 such as a keyboard, a mouse, a pen, a sound or voice input device, a touch or swipe input device, etc. The output device(s) 1316, such as a display, speakers, a printer, etc., may also be included. The aforementioned devices are examples, and others may be used. The computing system 1300 may include one or more communication connections 1317, allowing communications with other computing systems 1350. Examples of suitable communication connections 1317 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable, and non-removable media implemented in any method or technology for storage of information, such as computer-readable instructions, data structures, or program modules. The system memory 1304, the removable storage device 1312, and the non-removable storage device 1314 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage, or other magnetic storage devices, or any other article of manufacture which can be used to store information, and which can be accessed by the computing system 1300. Any such computer storage media may be part of the computing system 1300. Computer storage media does not include a carrier wave or other propagated or modulated data signal.

Communication media may be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 14A:
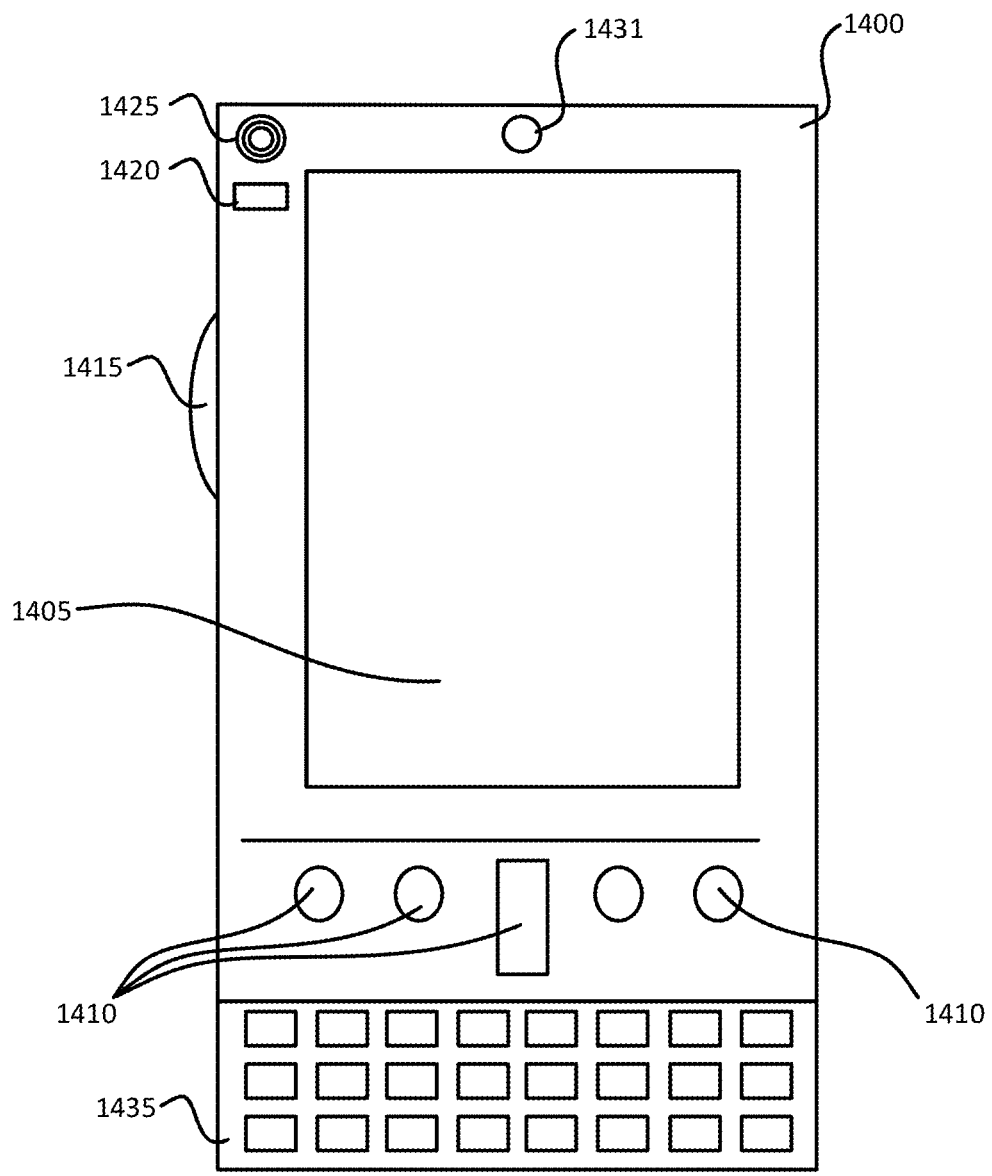
FIGS. 14A-14B depict details of one or more computing systems in accordance with examples of the present disclosure.
Figure 14B:
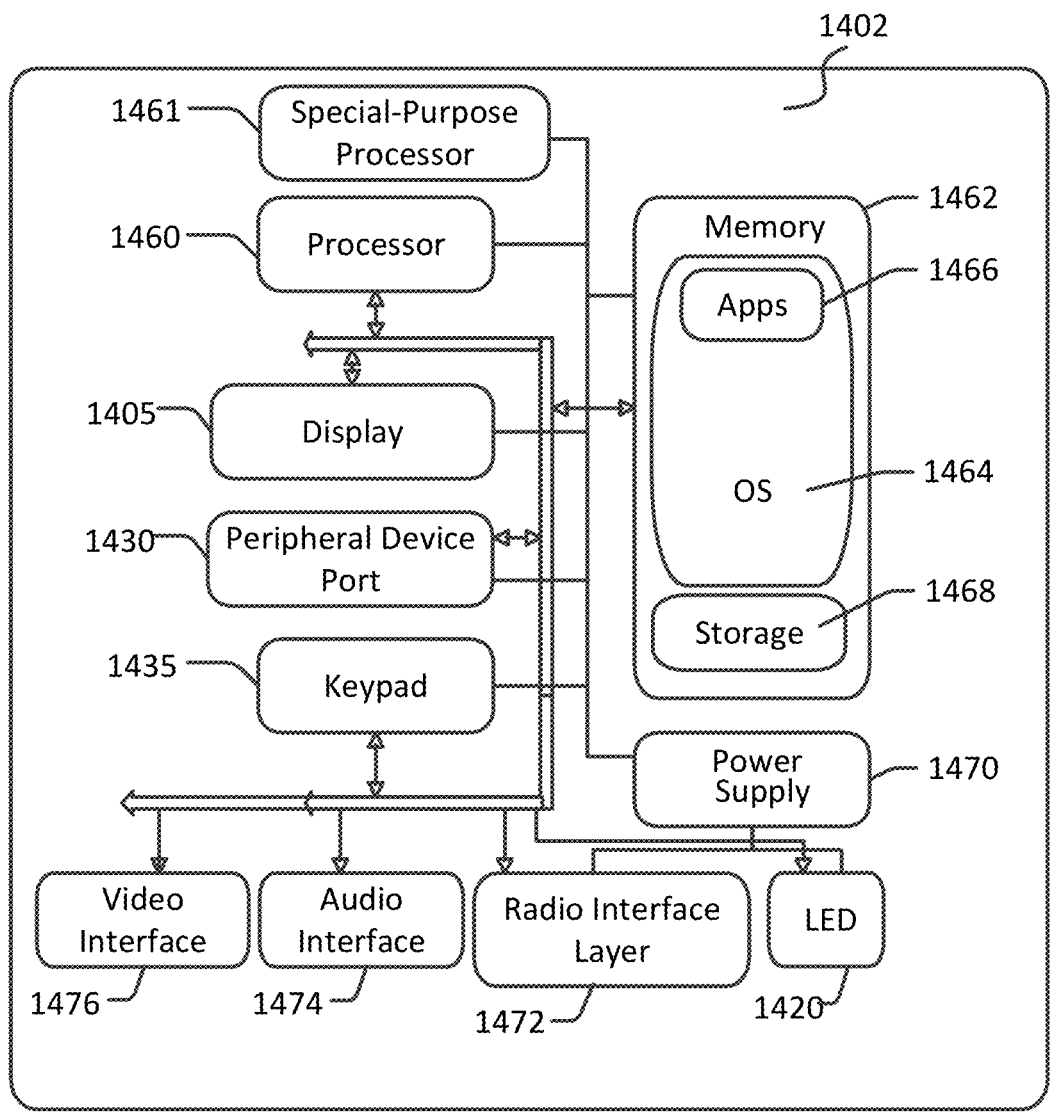

FIGS. 14A-14B illustrate a computing system 1400, for example, a mobile telephone, a smart phone, wearable computer (such as a smart watch), a tablet computer, a desktop computer, a laptop computer, and the like, with which examples of the disclosure may be practiced. With reference to FIG. 14A, one aspect of a computing system 1400 for implementing the aspects is illustrated. In a basic configuration, the computing system 1400 is a desktop computer having both input elements and output elements. The computing system 1400 typically includes a display 1405, which may also function as an input device (e.g., a touch screen display). The computing system 1400 may also include a keypad 1435. The keypad 1435 may be a physical keypad or a "soft" keypad generated on the touch screen display.

In various examples, the output elements include the display 1405 for showing a graphical user interface (GUI), a visual indicator 1420 (e.g., a light-emitting diode), and/or an audio transducer 1425 (e.g., a speaker). In yet another aspect, the computing system 1400 incorporates input and/or output ports, such as an audio input (e.g., a microphone jack), an audio output (e.g., a headphone jack), and a video output (e.g., an HDMI port) for sending signals to or receiving signals from an external device.

FIG. 14B is a block diagram illustrating the architecture of one aspect of a mobile computing system. That is, the computing system 1400 can incorporate a system (e.g., an architecture) 1402 to implement some aspects. In some examples, the system 1402 is implemented as a "computing system" capable of running one or more applications (e.g., browser, e-mail, calendaring, contact managers, messaging clients, games, and media clients/players). In some aspects, system 1402 is integrated as a computing system, such as a desktop computer.

One or more application programs 1466 may be loaded into the memory 1462 and run on or in association with the operating system 1464. Examples of the application programs include phone dialer programs, e-mail programs, personal information management (PIM) programs, word processing programs, spreadsheet programs, Internet browser programs, messaging programs, maps programs, and so forth. System 1402 also includes a nonvolatile storage area 1468 within the memory 1462. The nonvolatile storage area 1468 may be used to store persistent information that should not be lost if the system 1402 is powered down. The application programs 1466 may use and store information in the nonvolatile storage area 1468, such as e-mail or other messages used by an e-mail application, and the like. A synchronization application (not shown) also resides on system 1402 and is programmed to interact with a corresponding synchronization application resident on a host computer to keep the information stored in the nonvolatile storage area 1468 synchronized with corresponding information stored at the host computer. As should be appreciated, other applications may be loaded into the memory 1462 and run on the computing system 1400 described herein (e.g., search engine, extractor module, relevancy ranking module, answer scoring module, etc.).

The system 1402 has a power supply 1470, which may be implemented as one or more batteries. The power supply 1470 might further include an external power source, such as an AC adapter or a powered docking cradle that supplements or recharges the batteries.

The system 1402 may also include a radio interface layer 1472 that performs the function of transmitting and receiving radio frequency communications. The radio interface layer 1472 facilitates wireless connectivity between the system 1402 and the "outside world" via a communications carrier or service provider. Transmissions to and from the radio interface layer 1472 are conducted under the control of the operating system 1464. In other words, communications received by the radio interface layer 1472 may be disseminated to the application programs 1466 via the operating system 1464, and vice versa.

The system 1402 may further include a video interface 1476 that enables an operation of an on-board camera 1430 to record still images, video stream, and the like. A computing system 1400 implementing the system 1402 may have additional features or functionality. For example, the computing system 1400 may also include additional data storage devices (removable and/or non-removable) such as magnetic disks, optical disks, or tape. Such additional storage is illustrated in FIG. 14B by the nonvolatile storage area 1468.

Data/information generated or captured by the computing system 1400 and stored via the system 1402 may be stored locally on the computing system 1400, as described above, or the data may be stored on any number of storage media that may be accessed by the device via the radio interface layer 1472 or via a wired connection between the computing system 1400 and a separate computing system associated with the computing system 1400, for example, a server computer in a distributed computing network, such as the Internet. As should be appreciated, such data/information may be accessed via the computing system 1400 via the radio interface layer 1472 or via a distributed computing network. Similarly, such data/information may be readily transferred between computing systems for storage and use according to well-known data/information transfer and storage means, including electronic mail and collaborative data/information sharing systems.

Figure 15:
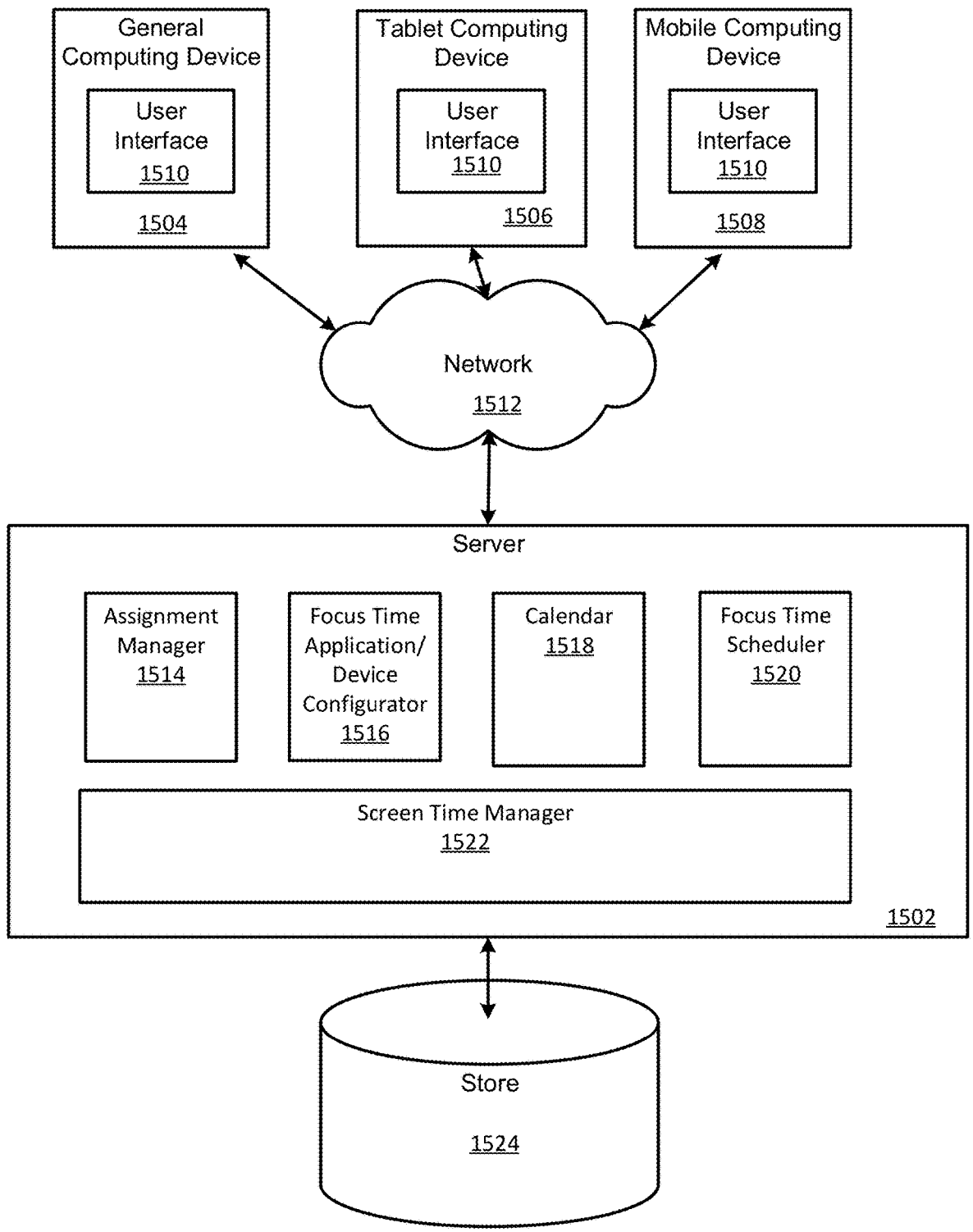
FIG. 15 depicts an architecture of a system for processing data received at a computing system in accordance with examples of the present disclosure.

FIG. 15 illustrates one aspect of the architecture of a system for processing data received at a computing system from a remote source, such as a personal computer 1504, a tablet computing device 1506, or mobile computing device 1508, as described above. Content at a server device 1502 may be stored in different communication channels or other storage types.

One or more of the previously described program modules 1306 or software applications 1320 may be employed by server device 1502 and/or the personal computer 1504, a tablet computing device 1506, or mobile computing device 1508, as described above. For example, the server device 1502 may include the assignment manager 1514, the focus time application/device configurator 1516, the calendar 1518, the focus time scheduler 1520, and/or the screen time manager 1522. The assignment manager 1514 may be the same as or similar to the assignment manager 208 previously described. The focus time application/device configurator 1516 may be the same as or similar to the focus time application/device configurator 210 previously described. The calendar 1518 may be the same as or similar to the calendar 214 previously described. The focus time scheduler 1520 may be the same as or similar to the focus time scheduler 216 previously described. The screen time manager 1522 may be the same as or similar to the screen time manager 218 previously described.

The server device 1502 may provide data to and from a client computing device such as a personal computer 1504, a tablet computing device 1506, and/or a mobile computing device 1508 (e.g., a smart phone) through a network 1515. By way of example, the computer system described above may be embodied in a personal computer 1504, a tablet computing device 1506, and/or a mobile computing device 1508 (e.g., a smart phone). Any of these examples of the computing devices may obtain content from the store 1524, in addition to receiving graphical data useable to be either pre-processed at a graphic-originating system or post-processed at a receiving computing system.

In addition, the aspects and functionalities described herein may operate over distributed systems (e.g., cloud-based computing systems), where application functionality, memory, data storage, and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which examples of the invention may be practiced includes keystroke entry, touch screen entry, voice or other audio entry, gesture entry where an associated computing device is equipped with detection (e.g., the camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of order, as shown in any flowchart. For example, two blocks shown in succession may, in fact, be executed substantially concurrently, or the blocks may sometimes be executed in the reverse order, depending upon the functionality/acts involved.

The present disclosure relates to systems and methods for using school related information to create a focus time for a user according to at least the examples provided in the sections below:

(A1) In one aspect, some examples include a method for using school related information to create a focus time for a user. The method may include receiving, from a learning management system database, electronic assignment information indicating that at least one assignment associated with a first user identifier is incomplete, identifying, by an electronic calendar service associated with the first user identifier, a block of time based on the metadata included in the electronic assignment information, assigning, by an electronic scheduling service, a focus time session identifier to the block of time identified by the electronic calendar service associated with the first user identifier, retrieving, by a focus time configurator, at least one of an application configuration profile or a device configuration profile based on the focus time session identifier, determining a second user identifier that is associated with the first user identifier, restricting a functionality of at least one of an application or a device associated with the second user identifier based on the at least one of the application configuration profile or the device configuration profile retrieved by the focus time configurator, receiving, by the learning management system database, an indication that the at least one incomplete assignment associated with the first user identifier has been completed and permitting the previously restricted functionality of the at least one of the application or the device associated with the second user identifier.

(A2) In some examples of A1, the method further includes retrieving categorical configuration information associated with the at least one of the application configuration profile or the device configuration profile, wherein the categorical configuration information including at least one of education, gaming, and social media category; permitting a functionality of the one or more applications and devices associated with a first category in the categorical configuration information; and restricting a functionality of the one or more applications and devices associated with a second different category in the categorical configuration information.

(A3) In some examples of A1-A2, the method further includes receiving a request to increase an amount of screen time associated with the second user identifier; retrieving electronic assignment information associated with the first user identifier from the learning management system database; and providing the electronic assignment information and the request to increase the amount of screen time to a device associated with at least one of a parent or guardian associated with the second user identifier.

(A4) In some examples of A1-A3, permitting the previously restricted functionality of the least one of the application or the device includes resuming screen time limits specific to the second user identifier.

(A5) In some examples of A1-A4, the method further includes retrieving electronic assignment information associated with the first user identifier from the learning management system database; providing the electronic assignment information to a device associated with at least one of a parent or guardian associated with the second user identifier; receiving an indication that a focus time session should be enabled; and restricting a functionality of one or more applications or devices based on the at least one of the application configuration profile or the device configuration profile retrieved by the focus time configurator.

(A6) In some examples of A1-A5, the method further includes retrieving electronic assignment information associated with the first user identifier from the learning management system database; providing the electronic assignment information to a device associated with at least one of a parent or guardian associated with the second user identifier; receiving an indication that a focus time session should be disabled; and permitting the functionality of the one or more applications or devices.

(A7) In some examples of A1-A6, the method further includes generating, at a machine learning model trained on training data including assignment information, at least one of a time of day for a focus time session or a duration of a focus time session based on the metadata indicating at least one of the subject of the at least one assignment, the period of time associated with the at least one assignment, or the completion date associated with the at least one assignment; and scheduling a focus time session according to the at least one of the time of day for the focus time session or the duration of the focus time session using the electronic calendaring service associated with the first user identifier.

In yet another aspect, some examples include a computing system including one or more processors and memory coupled to the one or more processors, the memory storing one or more programs configured to be executed by the one or more processors, the one or more programs including instructions for performing any of the methods described herein (e.g., A1-A7 described above).

In yet another aspect, some examples include a non-transitory computer-readable storage medium storing one or more programs for execution by one or more processors of a storage device, the one or more programs including instructions for performing any of the methods described herein (e.g., A1-A7 described above).

The present disclosure relates to systems and methods for using school related information to create a focus time for a user according to at least the examples provided in the sections below:

(B1) In one aspect, some examples include a method for using school related information to create a focus time for a user. The method may include receiving electronic assignment information from a learning system management database indicating that at least one assignment associated with a first user identifier is incomplete, identifying, by an electronic calendar service associated with the first user identifier, a block of time based on the metadata, retrieving at least one of an application configuration profile or a device configuration profile based on the block of time, determining a second user identifier that is associated with the first user identifier, causing at least one of an application or device associated with the second user identifier to become disabled based on the at least one of the application configuration profile or the device configuration profile, receiving, by the learning management system database, an indication that the at least one incomplete assignment associated with the first user identifier has been completed and causing the previously disabled at least one of the application or the device associated with the second user identifier to become enabled.

(B2) In some examples of B1, the method further includes retrieving categorical configuration information associated with the at least one of the application configuration profile or the device configuration profile, wherein the categorical configuration information includes at least one of education, gaming, and social media, causing one or more applications and devices associated with an education category to become enabled, and causing one or more applications and devices associated with a gaming category to become disabled.

(B3) In some examples of B1-B2, the method further includes receiving a request to increase an amount of screen time associated with the second user identifier, retrieving incomplete assignment information associated with the first user identifier from the learning management system database, and providing the incomplete assignment information and the request to increase the amount of screen time to a device associated with at least one of a parent or guardian associated with the second user identifier.

(B4) In some examples of B1-B3, enabling the previously disabled at least one of the application or the device includes resuming screen time limits specific to the second user identifier.

(B5) In some examples of B1-B4, the method further includes retrieving incomplete assignment information associated with the first user identifier, providing the incomplete assignment information to a device associated with at least one of a parent or guardian associated with the first user identifier, receiving an indication that a focus time session should be enabled, and causing one or more applications or devices to become disabled based on the at least one of the application configuration profile or the device configuration profile.

(B6) In some examples of B1-B5, the method further includes generating, at a machine learning model trained on training data including assignment information, at least one of a time of day for a focus time session or a duration of a focus time session based on the metadata indicating at least one of the subject of the at least one assignment, the period of time associated with the at least one assignment, or the completion date associated with the at least one assignment, and scheduling a focus time session according to the at least one of the time of day for the focus time session or the duration of the focus time session using the electronic calendaring service associated with the first user identifier.

In yet another aspect, some examples include a computing system including one or more processors and memory coupled to the one or more processors, the memory storing one or more programs configured to be executed by the one or more processors, the one or more programs including instructions for performing any of the methods described herein (e.g., B1-B6 described above).

In yet another aspect, some examples include a non-transitory computer-readable storage medium storing one or more programs for execution by one or more processors of a storage device, the one or more programs including instructions for performing any of the methods described herein (e.g., B1-B6 described above).

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate aspects falling within the spirit of the broader aspects of the general inventive concept embodied in this application that does not depart from the broader scope of the claimed disclosure.

What is claimed is:

1. A method, comprising:
  receiving, from a learning management system database, electronic assignment information indicating that at least one assignment associated with a first user identifier is incomplete, wherein the electronic assignment information includes metadata associated with at least one of a subject of the at least one assignment, a period of time associated with the at least one assignment, or a completion date associated with the at least one assignment;
  identifying, by an electronic calendar service associated with the first user identifier, a block of time based on the metadata included in the electronic assignment information;
  assigning, by an electronic scheduling service, a focus time session identifier to the block of time identified by the electronic calendar service associated with the first user identifier;
  retrieving, by a focus time configurator, at least one of an application configuration profile or a device configuration profile based on the focus time session identifier;
  determining a second user identifier that is associated with the first user identifier;
  restricting a functionality of at least one of an application or a device associated with the second user identifier based on the at least one of the application configuration profile or the device configuration profile retrieved by the focus time configurator;
  receiving, by the learning management system database, an indication that the at least one incomplete assignment associated with the first user identifier has been completed; and
  permitting the previously restricted functionality of the at least one of the application or the device associated with the second user identifier.

2. The method of claim 1, further comprising:
  retrieving categorical configuration information associated with the at least one of the application configuration profile or the device configuration profile, wherein the categorical configuration information includes at least one of education, gaming, and social media category;
  permitting a functionality of the one or more applications and devices associated with a first category in the categorical configuration information; and
  restricting a functionality of the one or more applications and devices associated with a second different category in the categorical configuration information.

3. The method of claim 2, further comprising:
  receiving a request to increase an amount of screen time associated with the second user identifier;
  retrieving electronic assignment information associated with the first user identifier from the learning management system database; and
  providing the electronic assignment information and the request to increase the amount of screen time to a device associated with at least one of a parent or guardian associated with the second user identifier.

4. The method of claim 1, wherein permitting the previously restricted functionality of the least one of the application or the device includes resuming screen time limits specific to the second user identifier.

5. The method of claim 1, further comprising:
  retrieving electronic assignment information associated with the first user identifier from the learning management system database;
  providing the electronic assignment information to a device associated with at least one of a parent or guardian associated with the second user identifier;
  receiving an indication that a focus time session should be enabled; and
  restricting a functionality of one or more applications or devices based on the at least one of the application configuration profile or the device configuration profile retrieved by the focus time configurator.

6. The method of claim 1, further comprising:
  retrieving electronic assignment information associated with the first user identifier from the learning management system database;
  providing the electronic assignment information to a device associated with at least one of a parent or guardian associated with the second user identifier;
  receiving an indication that a focus time session should be disabled; and
  permitting the functionality of the one or more applications or devices.

7. The method of claim 1, further comprising:
  generating, at a machine learning model trained on training data including assignment information, at least one of a time of day for a focus time session or a duration of a focus time session based on the metadata indicating at least one of the subject of the at least one assignment, the period of time associated with the at least one assignment, or the completion date associated with the at least one assignment; and
  scheduling a focus time session according to the at least one of the time of day for the focus time session or the duration of the focus time session using the electronic calendaring service associated with the first user identifier.

8. A system, comprising:
  one or more hardware processors configured by machine-readable instructions to:

receive, from a learning management system database, electronic assignment information indicating that at least one assignment associated with a first user identifier is incomplete, wherein the electronic assignment information includes metadata associated with at least one of a subject of the at least one assignment, a period of time associated with the at least one assignment, or a completion date associated with the at least one assignment;

identify, by an electronic calendar service associated with the first user identifier, a block of time based on the metadata included in the electronic assignment information;

assign, by an electronic scheduling service, a focus time session identifier to the block of time identified by the electronic calendar service;

retrieve, by a focus time configurator, at least one of an application configuration profile or a device configuration profile based on the focus time session identifier;

determine a second user identifier that is associated with the first user identifier;

restrict a functionality of at least one of an application or a device associated with the second user identifier based on the at least one of the application configuration profile or the device configuration profile retrieved by the focus time configurator;

receive, by the learning management system database, an indication that the at least one incomplete assignment associated with the first user identifier has been completed; and permitting the previously restricted functionality of the at least one of the application or the device associated with the second user identifier.

9. The system of claim 8, wherein the one or more hardware processors are further configured by machine-readable instructions to:

retrieve categorical configuration information associated with the at least one of the application configuration profile or the device configuration profile, wherein the categorical configuration information includes at least one of education, gaming, and social media category;

permit a functionality of the one or more applications and devices associated with a first category in the categorical configuration information; and restrict a functionality of the one or more applications and devices associated with a second different category in the categorical configuration information.

10. The system of claim 9, wherein the one or more hardware processors are further configured by machine-readable instructions to:

receive a request to increase an amount of screen time associated with the second user identifier;

retrieve incomplete assignment information associated with the first user identifier from the learning management system database; and provide the incomplete assignment information and the request to increase the amount of screen time to a device associated with at least one of a parent or guardian associated with the second user identifier.

11. The system of claim 8, wherein permitting the previously restricted functionality of the at least one of the application or the device includes resuming screen time limits specific to the second user identifier.

12. The system of claim 8, wherein the one or more hardware processors are further configured by machine-readable instructions to:

retrieve incomplete assignment information associated with the first user identifier from the learning management system database;

provide the incomplete assignment information to a device associated with at least one of a parent or guardian associated with the second user identifier;

receive an indication that a focus time session should be enabled; and restrict a functionality of one or more applications or devices based on the at least one of the application configuration profile or the device configuration profile retrieved by the focus time configurator.

13. The system of claim 8, wherein the one or more hardware processors are further configured by machine-readable instructions to:

retrieve incomplete assignment information associated with the first user identifier from the learning management system database;

provide the incomplete assignment information to a device associated with at least one of a parent or guardian associated with the second user identifier;

receive an indication that a focus time session should be disabled; and permit the functionality of the one or more applications or devices.

14. The system of claim 8, wherein the one or more hardware processors are further configured by machine-readable instructions to:

generate, at a machine learning model trained on training data including assignment information, at least one of a time of day for a focus time session or a duration of a focus time session based on the metadata indicating at least one of the subject of the at least one assignment, the period of time associated with the at least one assignment, or the completion date associated with the at least one assignment; and schedule a focus time session according to the at least one of the time of day for the focus time session or the duration of the focus time session using the electronic calendaring service associated with the first user identifier.

15. A computer-readable storage medium comprising instructions being executable by one or more processors to perform a method, the method comprising:

receiving electronic assignment information from a learning system management database indicating that at least one assignment associated with a first user identifier is incomplete, wherein the electronic assignment information includes metadata associated with at least one of a subject of the at least one assignment, a period of time associated with the at least one assignment, or a completion date associated with the at least one assignment;

identifying, by an electronic calendar service associated with the first user identifier, a block of time based on the metadata;

retrieving at least one of an application configuration profile or a device configuration profile based on the block of time;

determining a second user identifier that is associated with the first user identifier;

causing at least one of an application or device associated with the second user identifier to become disabled based on the at least one of the application configuration profile or the device configuration profile;

receiving, by the learning management system database, an indication that the at least one incomplete assignment associated with the first user identifier has been completed; and causing the previously disabled at least one of the application or the device associated with the second user identifier to become enabled.

16. The computer-readable storage medium of claim 15, wherein the instructions, which when executed by the one or more processors, cause the one or more processors to:

retrieve categorical configuration information associated with the at least one of the application configuration profile or the device configuration profile, wherein the categorical configuration information includes at least one of education, gaming, and social media;

cause one or more applications and devices associated with an education category to become enabled; and cause one or more applications and devices associated with a gaming category to become disabled.

17. The computer-readable storage medium of claim 15, wherein the instructions, which when executed by the one or more processors, cause the one or more processors to:

receive a request to increase an amount of screen time associated with the second user identifier;

retrieve incomplete assignment information associated with the first user identifier from the learning management system database; and provide the incomplete assignment information and the request to increase the amount of screen time to a device associated with at least one of a parent or guardian associated with the second user identifier.

18. The computer-readable storage medium of claim 15, wherein enabling the previously disabled at least one of the application or the device includes resuming screen time limits specific to the second user identifier.

19. The computer-readable storage medium of claim 15, wherein the instructions, which when executed by the one or more processors, cause the one or more processors to:

retrieve incomplete assignment information associated with the first user identifier;

provide the incomplete assignment information to a device associated with at least one of a parent or guardian associated with the first user identifier;

receive an indication that a focus time session should be enabled; and cause one or more applications or devices to become disabled based on the at least one of the application configuration profile or the device configuration profile.

20. The computer-readable storage medium of claim 15, wherein the instructions, which when executed by the one or more processors, cause the one or more processors to:

generate, at a machine learning model trained on training data including assignment information, at least one of a time of day for a focus time session or a duration of a focus time session based on the metadata indicating at least one of the subject of the at least one assignment, the period of time associated with the at least one assignment, or the completion date associated with the at least one assignment; and schedule a focus time session according to the at least one of the time of day for the focus time session or the duration of the focus time session using the electronic calendaring service associated with the first user identifier.

* * * * *